US011468483B2

(12) United States Patent
Shukla et al.

(10) Patent No.: US 11,468,483 B2
(45) Date of Patent: Oct. 11, 2022

(54) POOL GENERATION AND MANAGEMENT FOR EVENTS

(71) Applicant: PayPal, Inc., San Jose, CA (US)

(72) Inventors: Arjun Shukla, San Jose, CA (US); Lu Liu, Cupertino, CA (US); Gregory Paul Domorski, Milpitas, CA (US)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 16/910,559

(22) Filed: Jun. 24, 2020

(65) Prior Publication Data

US 2021/0406963 A1 Dec. 30, 2021

(51) Int. Cl.
| | |
|---|---|
| *G06Q 30/02* | (2012.01) |
| *G06N 20/00* | (2019.01) |
| *G06N 5/04* | (2006.01) |
| *G06Q 30/06* | (2012.01) |
| *G06F 21/62* | (2013.01) |
| *G06Q 50/00* | (2012.01) |

(Continued)

(52) U.S. Cl.
CPC ..... *G06Q 30/0279* (2013.01); *G06F 21/6245* (2013.01); *G06N 5/04* (2013.01); *G06N 20/00* (2019.01); *G06Q 20/108* (2013.01); *G06Q 30/0239* (2013.01); *G06Q 30/0605* (2013.01); *G06Q 30/0631* (2013.01); *G06Q 30/0633* (2013.01); *G06Q 40/02* (2013.01); *G06Q 50/01* (2013.01)

(58) Field of Classification Search
CPC . G06Q 30/0279; H04W 4/029; G06F 16/435; G06F 16/438
See application file for complete search history.

(56) References Cited

U.S. PATENT DOCUMENTS

| | | | |
|---|---|---|---|
| 10,586,250 B1* | 3/2020 | Spils | G06Q 30/0259 |
| 10,909,582 B1* | 2/2021 | Brandt | G06Q 20/3267 |

(Continued)

OTHER PUBLICATIONS

Lunden, "PayPal launches Money Pools, where groups chip in to raise money to buy things," https://techcrunch.com/2017/11/10/paypal-money-pools/?utm_medium=TCnewsletter, Nov. 10, 2017, 3 pages.

(Continued)

*Primary Examiner* — Scott C Anderson
(74) *Attorney, Agent, or Firm* — Greenberg Traurig, LLP

(57) ABSTRACT

Techniques for generation and management of pools for events are presented. Pool management component (PMC) generates an event associated with a recipient. Within a period of time of the event, PMC generates a pool relating to the event. Based on contact user data, transaction data relating to transactions or interactions between recipient and merchants, and affinities of the recipient to contact users or merchants, PMC determines which users to invite as candidates to contribute monetary funds to the pool and which merchants to be candidates to the pool and to present offers for products. Notification component notifies candidates of their invitation to participate in the pool. Pool component receives contributions from user candidates and offers from merchant candidates. At time of the event, notification component notifies recipient of the gift being presented to recipient via the pool, the gift comprising money, a product, or offer for a product.

20 Claims, 13 Drawing Sheets

(51) Int. Cl.
  *G06Q 20/10*    (2012.01)
  *G06Q 40/02*    (2012.01)

(56) References Cited

U.S. PATENT DOCUMENTS

| | | | |
|---|---|---|---|
| 2014/0279233 A1* | 9/2014 | Lau | G06Q 30/0603 |
| | | | 705/26.41 |
| 2015/0148129 A1* | 5/2015 | Austerlade | G07F 17/3234 |
| | | | 463/31 |
| 2015/0242951 A1* | 8/2015 | Pillai | G06Q 40/06 |
| | | | 705/36 R |
| 2019/0378027 A1* | 12/2019 | Jarvis | G06Q 30/0224 |
| 2020/0042916 A1* | 2/2020 | Jaiswal | G06F 40/30 |
| 2020/0074112 A1* | 3/2020 | Ren | H04L 9/008 |

OTHER PUBLICATIONS

Austin, "Join friends and family for a group purchase with PayPal's new Money Pools," https://www.digitaltrends.com/computing/paypal-money-pools/, Nov. 11, 2017, 2 pages.

\* cited by examiner

POOL GENERATION AND MANAGEMENT FOR EVENTS

TECHNICAL FIELD

The subject disclosure relates generally to electronic communications, e.g., to pool generation and management for events.

BACKGROUND

People can use various online and digital services to, for example, manage financial accounts, make payments on bills from financial accounts, purchase goods and services from businesses via websites of businesses, or send or transfer money to another person. For instance, there are digital wallet services that enable a person to use a communication device (e.g., mobile phone or computer) and an application (e.g., mobile digital wallet application) to transfer money, via an electronic transfer, from the person's digital wallet to another digital wallet of another entity, such as a friend or business. However, conventional techniques, applications, and online and digital services for the electronic transfer of money generally can be relatively limited in scope, inefficient, and lacking in services, which can negatively impact the user experience.

Systems, methods, and/or techniques that can ameliorate one or more of these problems can be desirable.

DETAILED DESCRIPTION

Figure 1:
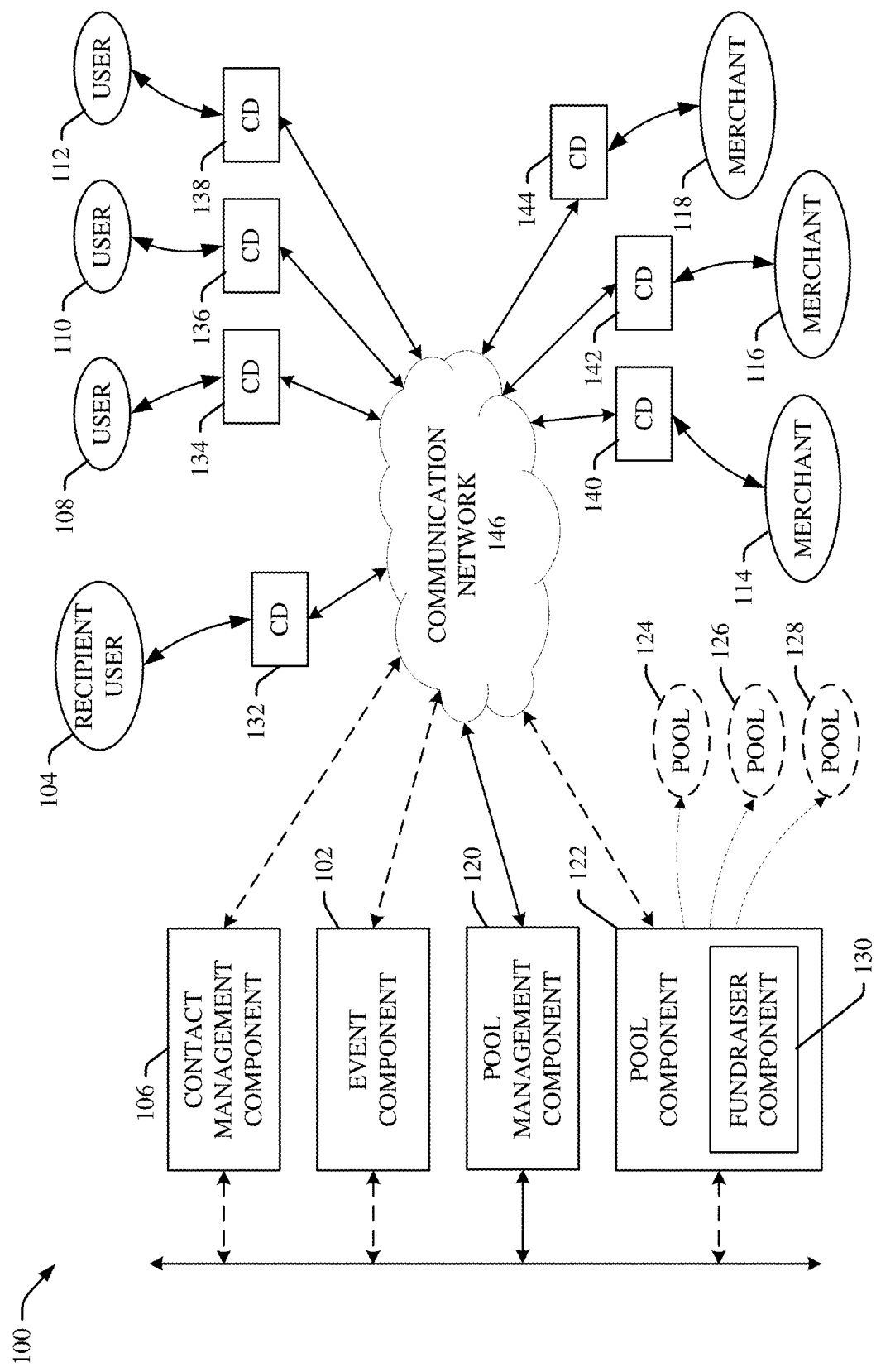
FIG. 1 illustrates a block diagram of an example, non-limiting system that can desirably generate and manage pools in connection with events and recipient users, in accordance with various aspects and embodiments of the disclosed subject matter.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

People can use various online and digital services to, for example, manage financial accounts, make payments on bills from financial accounts, purchase goods and services from businesses via websites of businesses, or send or transfer money to another person. For instance, there are digital wallet services that enable a person to use a communication device (e.g., mobile phone or computer) and an application (e.g., mobile digital wallet application) to transfer money, via an electronic transfer, from the person's digital wallet to another digital wallet of another entity, such as a friend or business. A person also can purchase an electronic gift card that can be sent to another person, for example, at a destination address, such as an email address, of the other person. A person also can set up an electronic fundraising account to try to raise money for a certain purpose (e.g., to pay for medical bills or other expenses when a person is in an accident or is seriously ill). However, conventional techniques, applications, and online and digital services for the electronic transfer of money generally can be relatively limited in scope, inefficient, and lacking in services, which can negatively impact the user experience.

Various embodiments of the disclosed subject matter can address one or more of these issues/problems by facilitating desirable (e.g., efficient, enhanced, robust, and/or optimal) automated pool generation and pool management for events. One or more embodiments described herein include systems, computer-implemented methods, apparatus, and/or computer program products that can facilitate automated pool generation and pool management for events in a service-oriented computing system.

To that end, techniques for automated generation and management of pools for events are presented. The disclosed subject matter can comprise a pool management component that can generate and manage pools for events associated with recipient users. The pool management component can comprise an event generator component that can enable a user to select an event (e.g., birthday, holiday, or other special occasion) associated with an intended recipient (e.g., a friend or relative of the user) for which the user desires to start a pool (e.g., an electronic pool) in order to allow users (e.g., friends or relatives of the recipient) to contribute towards a gift for the recipient at the time of the event. In response to input information received from the user, the event generator component can determine the recipient selected by the user, determine the event (e.g., type of event or occasion) selected by the user, determine the date of the event as selected by the user. The event generator component can generate the event and can associate (e.g., link) the recipient and the date of the event with the event.

At a desired time prior to the event (e.g., five days, one week, two weeks, or other desired time prior to the event), a pool generator component of the pool management component can determine that the date of the event is upcoming, and the pool generator component can generate a pool relating to the event and associated with the recipient. The pool management component can employ a masking component that had hide the pool and information relating to the pool from the recipient until the time of the event to facilitate keeping the recipient from finding out about the pool or the intended gift for the recipient that is or will be associated with the pool before the time of the event.

The pool management component also can comprise a candidate selector component that can access contact user data associated with the recipient from a contact management component (e.g., contact management server), wherein the contact user data can comprise information regarding users associated with (e.g., known by, friends with, acquaintances with, or related to) the recipient. In some embodiments, the candidate selector component also can access social media data, online data, or other data (e.g., demographic data or other extrinsic information) associated with the recipient, wherein the social media data can be obtained from, for example, social media accounts or applications associated with the recipient, and can indicate users who have an association with the recipient. Based at least in part on the results of analyzing the contact user data, social media data, online data, or other data associated with the recipient, and respective affinities of the recipient with regard to respective users of a set of users associated with the recipient, the candidate selector component can determine a subset of users that can be candidates (e.g., user candidates) to participate in the pool associated with the recipient.

The candidate selector component also can access transaction data relating to transactions (e.g., previous transactions) for products (e.g., services or goods) between the recipient and merchants. In certain embodiments, the candidate selector component also can access social media data, online data, or other data that can indicate potential interest in products of merchants by the recipient (e.g., recipient clicking on an online advertisement for a product). Based at least in part on the results of analyzing the transaction data, social media data, online data, or other data associated with the recipient, and respective affinities of the recipient with regard to respective merchants of a set of merchants associated with the recipient or with regard to products of merchants, the candidate selector component can determine a subset of merchants that can be candidates (e.g., merchant candidates) to participate in the pool associated with the recipient. The candidate selector component can assign the subset of merchants to the pool.

In some embodiments, the pool management component can employ an artificial intelligence (AI) component that can analyze such data relating to users, merchants, transactions, social media, or online activity, etc. Based on the results of such analysis (e.g., AI analysis or machine learning analysis), the AI component can determine or infer users to select to be user candidate or merchants to select to be merchant candidates to participate in the pool associated with the recipient.

The pool management component can include a notification component that can send notification messages (e.g., invitation messages) to user candidates to invite the user candidates to participate in, and contribute monetary funds to, the pool associated with the recipient, to give the recipient a gift in connection with the event. The notification component also can send notification messages to merchant candidates to notify the merchant candidates of the pool associated with the recipient, the event, and date of the event, and to inquire as to whether they desire to provide offers or discounts for their products to the pool associated with the recipient.

The pool management component can include a tracking component that can track respective activity associated with respective pools that can be associated with respective recipients in connection with respective events. For instance, the tracking component can track contributions of monetary funds to the pool that are received from user candidates, wherein the monetary funds (e.g., electronic monetary funds) can be stored in the pool, which can be stored in a pool component (e.g., a fundraiser component of the pool component) that can store the respective pools associated with respective recipients. The tracking component also can track offers or discounts received from merchant candidates, wherein such offers or discounts can be deposited in the pool associated with the recipient. The notification component can provide (e.g., communicate) updates (e.g., update messages) to the user who initiated the pool for the recipient and/or the other user candidates to update regarding the status of the pool, including how much money is in the pool, what offers or discounts have been provided to the pool by merchants, and/or how much more money is needed to reach a desired monetary goal (e.g., to purchase a particular product), etc.

In accordance with various embodiments, the pool management component or the AI component can determine or infer a gift to be purchased for the recipient based at least in part on the results of analyzing the respective affinities of the recipient with regard to respective products or respective merchants, the amount of money in the pool, respective offers or discount amounts of respective products as provided by the merchant candidates, and/or other desired factors. As part of such analysis, the pool management component and/or the AI component can analyze the social media data, online data, and/or other data associated with the recipient. The social media data or online data can indicate, for example, certain products that the recipient has expressed an interest in (e.g., by clicking on or interacting with an online advertisement for a product; by reading an article about a product; or by accessing a website of a merchant). The pool management component, employing the notification component, can communicate, to the user or other user candidates, a recommendation message to recommend a particular product, or associated offer or discount for the particular product, to be the gift, or part of the gift.

If and as desired, the user or other user candidates can select the recommended product, offer, or discount, or can select another desired product, offer, or discount. In some embodiments, as desired, at a desired time before the event, the user or other candidate users can apply the monetary funds, or portion thereof, in the pool to purchase a product (e.g., recommended product or other desired product) and/or accept a particular offer or discount for a product that is in the pool. In other embodiments, the pool management component can employ a provisioning component that can allocate or apply (e.g., automatically allocate or apply) monetary funds from the pool towards the purchase of a product, wherein the product (and/or associated offer or discount) can be selected by user and/or other user candidates, or the product (and/or associated offer or discount) can be determined (e.g., automatically determined) by the pool management component, based at least in part on the affinity of the recipient towards a particular product (e.g., recipient has highest affinity for a product that is able to be purchased with the money in the pool), preferences of the user candidates for a product to select as a gift, and/or other factors. In still other embodiments, the user candidates can decide that the contents (e.g., monetary funds, and offers or discounts for products) of the pool can be the gift, wherein the recipient can select a desired product (and associated offer or discount) to which to apply the money in the pool or can accept the money as a gift, or a combination thereof.

At the time of the event, or at a desired time prior to the event, the masking component can unmask the pool and information associated therewith to enable the recipient to perceive (e.g., view) the pool and associated information. Also, at the time of the event, or at a desired time prior to the event, the notification component can send a notification message (e.g., gift notification message) to the recipient, wherein the notification message can notify the recipient about the gift (or potential gift options) associated with the pool, inform the recipient about who (e.g., user candidates) is presenting the gift, inform the recipient regarding how to accept and receive the gift from the pool, and/or, if a product has already been purchased as a gift, inform the recipient regarding the product purchased as a gift (e.g., shipping details, or location where product can be picked up, . . . ).

These and other aspects and embodiments of the disclosed subject matter will now be described with respect to the drawings.

FIG. 1 illustrates a block diagram of an example, non-limiting system 100 that can desirably (e.g., efficiently or optimally) generate and manage pools in connection with events and recipient users, in accordance with various aspects and embodiments of the disclosed subject matter. The system 100 can comprise an event component 102 that can be utilized to store information regarding events associated with users (e.g., recipient users who are intended to be recipients of gifts from other users). The event-related information can include, for example, the type of event or occasion, the date of the event, a recipient user 104 associated with the event, and/or other desired information (e.g., location of the event, if applicable) regarding the event. The event can be, for example, a birthday of the recipient user 104, a wedding of the recipient user 104, a school graduation event of the recipient user 104, a school-related event associated with the recipient user 104, a holiday event, a religious event, an anniversary-related event of the recipient user 104, a sporting event, a musical event, an entertainment event, a work-related event associated with the recipient user 104, or a generic or custom event that can be specified by a user, such as described herein.

The system 100 also can include a contact management component 106 (e.g., contact management server) that can process and/or store information (e.g., contact user data) relating to respective users (also referred to herein as contact users), such as, for example, user 108, user 110, and user 112, who can be associated with respective recipient users (e.g., recipient user 104). The contact user data can comprise, for example, for each user (e.g., user 108, user 110, and/or user 112, . . . ), a name of a user, an address of a user, a phone number (e.g., home or mobile phone number) of a user, a device identifier of a communication device (e.g., mobile or smart phone, computer, electronic pad or tablet, or electronic bodywear, . . . ) associated with a user, an Internet protocol (IP) address associated with a communication device of a user, an email address of a user, a type of association (e.g., friend, relative, spouse, co-worker, acquaintance, or other association) of a user with a recipient user, an age of a user, a gender of a user, employment or job information of a user, and/or other desired information associated with a user (e.g., demographic information associated with a user).

The contact management component 106 also can comprise information (e.g., transaction data) relating to respective transactions or potential transactions for products (e.g., goods or services) between a recipient user (e.g., recipient user 104) and respective merchants (e.g., merchant users), such as, for example, merchant 114, merchant 116, and merchant 118. The transaction data can include, for each transaction or potential transaction (e.g., interest in a product), for example, a type of transaction or potential transaction (e.g., online purchase via a merchant website, online purchase via an online marketplace website, or purchase from a physical store, . . . ), a date of the transaction or potential transaction, a purpose (e.g., personal, hobby, recreational, or business, . . . ) of the transaction or potential transaction, type of product (e.g., type of good, or type of service) associated with the transaction or potential transaction, a name of a merchant associated with the transaction or potential transaction, an address of a merchant, a website address of a merchant, an email address of a merchant, a phone number of a merchant, a device identifier or an IP address associated with a communication device of a merchant, various products associated with a merchant, and/or other desired information associated with a transaction, potential transaction, or merchant.

The system 100 also can comprise a pool management component 120 and a pool component 122, which can be associated with the pool management component 120. The pool management component 120 can generate and manage pools, such as, for example, pool 124, pool 126, and/or pool 128, in connection with events associated with recipient users, such as recipient user 104. The pool management component 120 can manage operation of the pool component 122, the event component 102, contact management component 106, and other components to facilitate managing operations relating to the pools, as more fully described herein. In some embodiments, the pool component 122 can include a fundraiser component 130 that can receive and manage contributions (e.g., monetary funds) received from users (e.g., user 108, user 110, and/or user 112, . . . ) and can desirably (e.g., properly) allocate respective contributions to respective pools (e.g., pool 124, pool 126, or pool 128, . . . ) as desired (e.g., intended) by the respective users contributing to the respective pools.

The recipient user 104 can have or be associated with communication device (CD) 132, users 108, 110, and 112, can respectively have or be associated with communication devices 134, 136, and 138, and merchants 114, 116, and 118 can respectively have or be associated with communication devices 140, 142, and 144. A communication device also can be referred to as, for example, a device, a mobile device, a mobile communication device, or user equipment (UE). Examples of communication devices can include, but are not limited to, a mobile terminal, a cellular and/or smart phone, a landline phone, a computer (e.g., a laptop embedded equipment (LEE), a laptop mounted equipment (LME), or other type of computer), a Personal Digital Assistant (PDA), a tablet or pad (e.g., an electronic tablet or pad), an electronic notebook, an electronic gaming device, electronic eyeglasses, headwear, or bodywear (e.g., electronic or smart eyeglasses, headwear (e.g., augmented reality (AR) or virtual reality (VR) headset), or bodywear (e.g., electronic or smart watch) having wireless communication functionality), a music or media player, speakers (e.g., powered speakers having wireless communication functionality), an appliance (e.g., a toaster, a coffee maker, a refrigerator, or an oven, . . . , having wireless communication functionality), a set-top box, an IP television (IPTV), a device associated or integrated with a vehicle (e.g., automobile, airplane, bus, train, or ship, . . . ), a virtual assistant (VA) device, a drone, and/or any other type of communication devices (e.g., other types of Internet of Things (IoTs)).

The system 100 can include a communication network 146 that can facilitate wireline or wireless communication of information between devices associated with (e.g., communicatively connected to) the communication network 146. The communication network 146 can comprise a packet data network (e.g., an IP-based network, such as the Internet and/or intranet) and a mobility network that can be associated with the packet data network. The communication network 146 can comprise various network nodes, components, and devices that can facilitate communication of information within the communication network 146 and between devices associated with the communication network 146.

At desired times, the communication devices (e.g., 132, 134, 136, 138, 140, 142, and 144) can be associated with the communication network 146 to communicate with other communication devices and associated users. The pool management component 120 also can be associated with (e.g., communicatively connected to) the communication network 146 to facilitate generation and management of pools (e.g., pool 124, pool 126, and/or pool 128, . . . ) associated with events, as such pools are initiated by users (e.g., user 108) in order to pool together contributions from users (e.g., user 108, user 110, and/or user 112, . . . ) in a pool (e.g., pool 124) to get a desired gift for a recipient user (e.g., recipient user 104) in connection with an event associated with the recipient user. In some embodiments, the event component 102, contact management component 106, and/or pool component 122 can be associated with the communication network 146 to facilitate being associated with the pool management component 120. Additionally or alternatively, the event component 102, contact management component 106, and/or pool component 122 can be associated with the pool management component 120 via a separate network (e.g., an intranet, a local area network (LAN), a wide area network (WAN), or other type of network).

Figure 2:
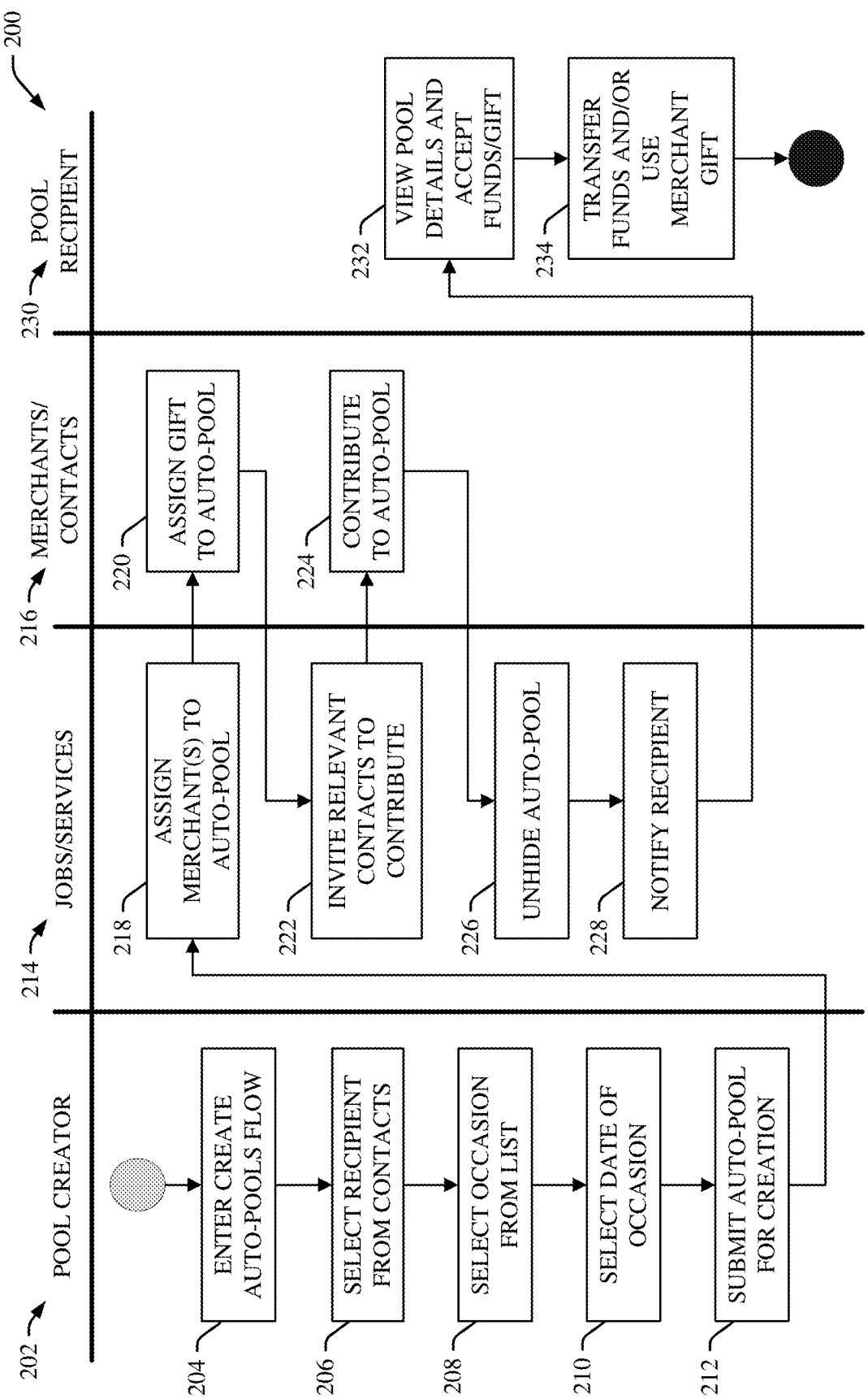
FIG. 2 depicts a diagram of example, non-limiting pool generation and management flow, in accordance with various aspects and embodiments of the disclosed subject matter.
Figure 3:
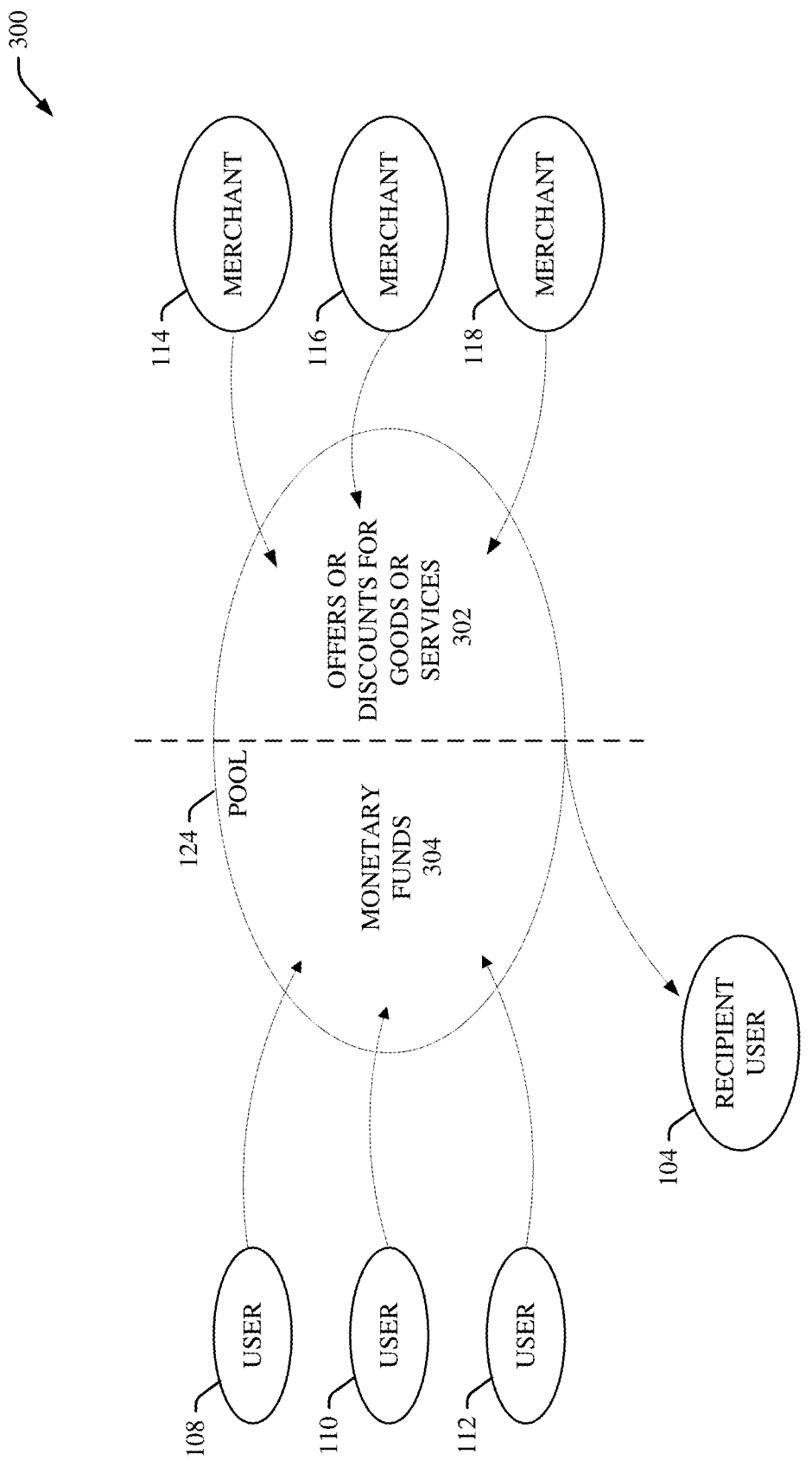
FIG. 3 presents a diagram of an example, non-limiting pool structure for a pool associated with an event, in accordance with various aspects and embodiments of the disclosed subject matter.
Figure 4:
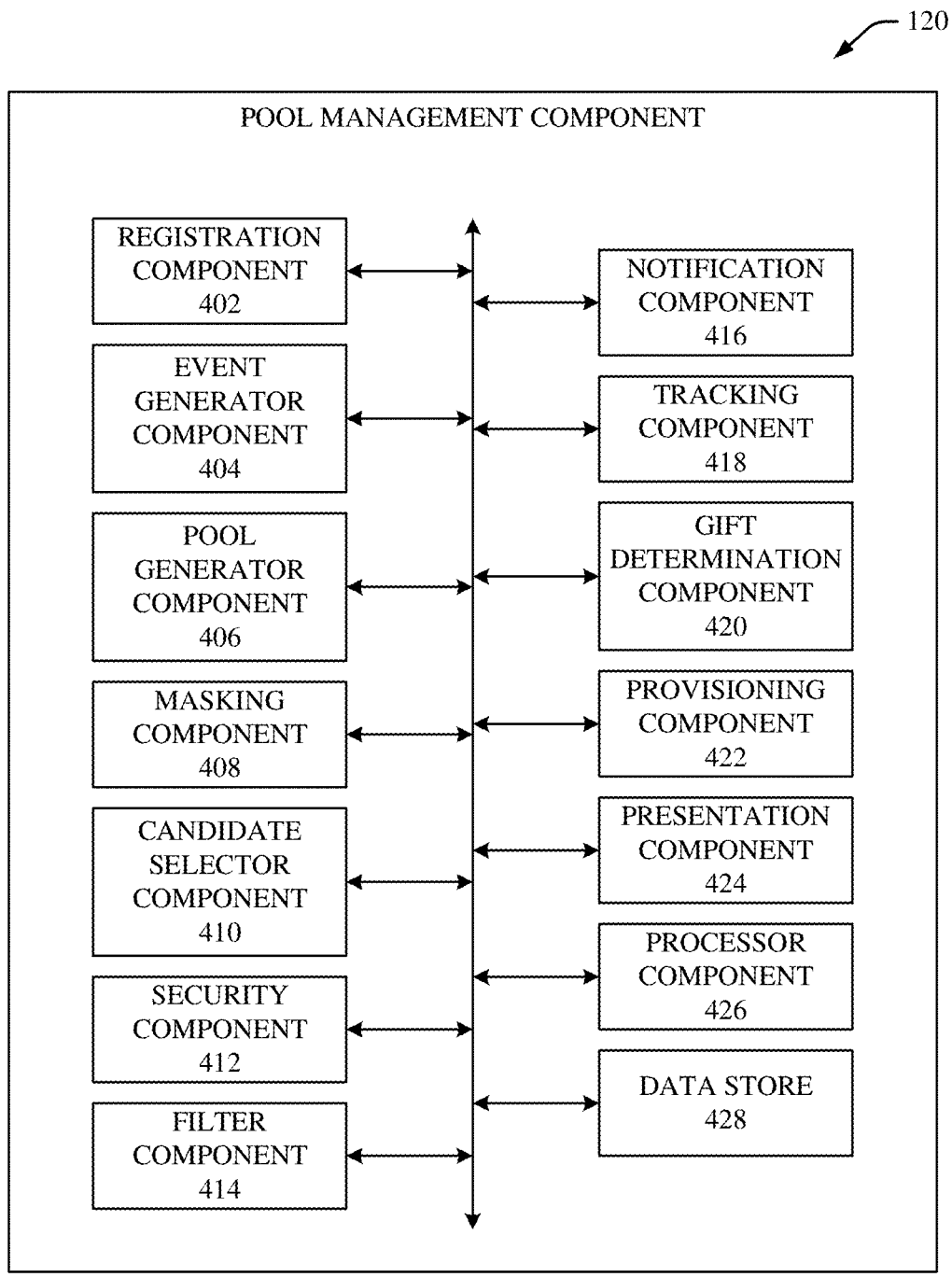
FIG. 4 illustrates a block diagram of an example, non-limiting pool management component, in accordance with various aspects and embodiments of the disclosed subject matter.

Referring to FIGS. 2-4 (along with FIG. 1), FIG. 2 depicts a diagram of example, non-limiting pool generation and management flow 200, in accordance with various aspects and embodiments of the disclosed subject matter. FIG. 3 presents a diagram of an example, non-limiting pool structure 300 for a pool associated with an event, in accordance with various aspects and embodiments of the disclosed subject matter. FIG. 4 illustrates a block diagram of the pool management component 120, including other components and features of the pool management component 120, in accordance with various aspects and embodiments of the disclosed subject matter.

The pool management component 120 can comprise a registration component 402 that be utilized to register and enroll users (e.g., user 108, user, 110, user 112, or recipient user 104) for pool-related services or other financial services. During registration, the registration component 402 can have a user (e.g., user 108) provide various information, such as, for example, a name, residential address, phone number (e.g., mobile or landline phone number), email address, or other information. The registration component 402 also can have the user (e.g., user 108) register an account, which can be secured by a unique username and password. The registration component 402 can store account information, including the unique username and password, in a user profile associated with the user. The registration component 402 can facilitate having the user (e.g., user 108) download an application (e.g., mobile application) to the communication device (e.g., communication device 134) of the user. The user can utilize the application or a web-based application to access the account.

During registration and enrollment, or at a desired time thereafter, the registration component 402 can have the user (e.g., user 108) provide information regarding events (e.g., special events or occasions), as desired by the user. The events can relate to the user (e.g., user 108) or to another user (e.g., recipient user 104). The event can be, for example, a birthday of a user (e.g., recipient user 104), a wedding of a user, a school graduation event of a user, a school-related event associated with a user, a holiday event, a religious event, an anniversary-related event of a user, a sporting event, a musical event, an entertainment event, a work-related event associated with a user, or a generic or custom event associated with a user. The event-related information can be stored in the event component 102.

At a desired time, a user (e.g., user 108, recipient user 104) can desire to have a pool created in connection with an event. For instance, a user (e.g., 108) can desire to have a pool created for a special event of another user (e.g., recipient user 104), such as a friend, relative, or co-worker, in order to allow users (e.g., friends or relatives of the recipient user 104) to contribute money towards a gift for the recipient user 104 to be presented to the recipient user 104 at or near the time of the event. In some instances, a recipient user 104 can desire to have a pool created for the recipient user's own event.

For example, if user 108 desires to have a pool created for an event associated with the recipient user 104, the user 108 can utilize the communication device 134 to access the user's account and provide information (e.g., input information) to facilitate establishing a pool, such as pool 124. The pool management component 120 can comprise an event generator component 404 that can engage pool creator functions 202 to facilitate creating (e.g., automatically creating) a pool 124 in connection with the event and recipient user 104. In response to the input information received from the communication device 134, the event generator component 404 can enter the auto-pools flow 204 to facilitate automatically generating the pool 124. The event generator component 404 can have the user 108 provide other input information to facilitate selecting the recipient user 104. For instance, the user 108 can use the communication device 134 to input information to select the recipient user 104 from the user's contacts (e.g., list of contacts), and the event generator component 404 can select the recipient user 104 based at least in part on such input information, as indicated at reference numeral 206 of the pool generation and management flow 200. The selection of the recipient user 104 as a contact of the user 108 can facilitate providing information, such as identifying information (e.g., name, email address, phone number, residential address, or username, . . . ), regarding the recipient user 104 that can be associated with the contact name (e.g., the recipient user's name). For instance, the event generator component 404 can access information regarding the recipient user 104 from the contact management component 106. Additionally or alternatively, the event generator component 404 can have the user 108 provide desired identifying information relating to the recipient user 104.

The event generator component 404 also can have the user 108 select an occasion (e.g., event, such as a birthday, wedding, or graduation, . . . ) from a list of occasions, and, in response to the input information (e.g., event selection information) received from the communication device 134 of the user 108, the event generator component 404 can determine and select the occasion from the list of occasions, as indicated at reference numeral 208. If the desired occasion is to be a generic or custom occasion as specified by the user 108, the user 108, using communication device 134, can provide input information, via an interface (e.g., an application interface or a website interface), to the event generator component 404 to indicate that the user 108 desires to create a generic or custom occasion, and the user 108 can enter an occasion name (e.g., custom event name) that can specify what the occasion is or to what it relates (e.g., user 108 can enter the custom event name into a field, such as a "custom" or "other" field, of the interface). In response receiving input information to create a generic or custom occasion, the event generator component 404 can label the occasion as specified by the user 108.

The event generator component 404 further can have the user 108 select a date of the occasion, and, in response to the date information received from the communication device 134 of the user 108, the event generator component 404 can determine and select the date of the occasion, as indicated at reference numeral 210. In some embodiments, the event generator component 404 can allow the user 108 to select or indicate a pool creation date or deadline for the pool 124 to facilitate determining when the pool 124 is to be created in relation to the event (e.g., on what date prior to the event or how many days prior to the event the pool 124 is to be created). If the user 108 does not select or indicate a pool creation date or deadline, the event generator component 404 can apply a default pool creation date or deadline to the pool 124. In accordance with various embodiments, the default pool creation date or deadline can be static for different types of events (e.g., by default, create pool 5 days prior to the event, regardless of the type of event), or the event generator component 404 can determine a particular default pool creation date or deadline to utilize for a pool 124, based at least in part on the type of event associated with the pool 124, in accordance with the defined pool management criteria. The event generator component 404 can generate the event and can associate (e.g., link) the recipient user 104 and the date of the event with the event. The event generator component 404 can submit the pool (e.g., auto-pool) for creation, as indicated at reference numeral 212 of the pool generation and management flow 200.

The pool management component 120 can include a pool generator component 406 that can generate (e.g., automatically generate or create) pools (e.g., pool 124, pool 126, or pool 128) for events. The pool generator component 406 can monitor for upcoming events for which pools are to be created. With regard to the event associated with the recipient user 104, at a desired time prior to the event (e.g., five days, one week, two weeks, or other desired time prior to the event), in response to determining that the event is upcoming, from the event-related information, such as the selected date, associated with the event, the pool generator component 406 can determine that the date of the event is upcoming, and the pool generator component 406 can generate a pool 124 relating to the event and associated with the recipient user 104, as well as user 108 who initiated creation of the pool 124 for the event.

In some embodiments, upon generation of the pool 124, the pool management component 120 can employ a masking component 408 that had conceal (e.g., hide or mask) the pool 124 and pool-related information from the recipient user 104 until the time of the event to facilitate keeping the recipient user 104 from finding out about the pool 124 or the intended gift for the recipient user 104 that is or will be associated with the pool 124 before or by the time of the event. For instance, the masking component 408 can obtain (e.g., retrieve) information relating to the recipient user 104 from the event component 102, the contact management component 106, or another data source (e.g., data store), wherein such information can identify the recipient user 104 and any communication devices, such as communication device 132, associated with the recipient user 104. Such information can include the name, username, or password, etc., associated with the recipient user 104 and/or device identifier information (e.g., phone number, international mobile equipment identifier (IMEI), unique device identifier for advertising (e.g., IDFA or AAID), media access control (MAC) address, IP address, or other unique identifier) associated with the communication device 132 of the recipient user 104. To facilitate securing the pool 124 and pool-related information, the masking component 408 can structure the mask for the pool 124 to monitor entities (e.g., users) and communication devices that are attempting to locate (e.g., find or search for), access, or view pools, such as pool 124, based at least in part on respective identifying information associated with the entities and communication devices. The masking component 408 can utilize the mask to detect if and when the recipient user 104 and/or the recipient user's communication device 132 are attempting to locate, access, or view pools, and the mask can prevent an entity (e.g., recipient user 104) having identifying information (e.g., name, username, or password) associated with the recipient user 104 and/or a communication device (e.g., the recipient user's communication device 132) having identifying information (e.g., the device identifier information) associated with such entity from locating, accessing, viewing, or otherwise becoming aware of the pool 124.

The pool management component 120 can engage the jobs/services functions 214 to perform various tasks and assignments associated with the pool 124 and associated event. As part of the jobs/services functions 214, the pool management component 120 can determine merchants and contacts (e.g., users associated with the recipient user 104), and interact with certain merchants and contacts, to facilitate management of the pool 124, including soliciting and/or procuring contributions from contacts and product offers from merchants, as indicated at reference numeral 216 of the pool generation and management flow 200.

In some embodiments, the pool management component 120 can comprise a candidate selector component 410 that can assign one or more merchants (e.g., merchant 114, merchant 116, and/or merchant 118) to the pool 124 (e.g., auto-pool), as indicated at reference numeral 218 of the pool generation and management flow 200. In that regard, the candidate selector component 410 can access transaction data relating to transactions (e.g., previous transactions) for products (e.g., services or goods) between the recipient user 104 and various merchants, such as merchant 114, merchant 116, and/or merchant 118. In certain embodiments, the candidate selector component 410 also can access social media data, online data, user preference information, or other data that can indicate potential interest in merchants or products of merchants by the recipient user 104 (e.g., recipient user 104 clicking on an online advertisement for a product, recipient user 104 viewing a merchant's product on a web page of the merchant, or recipient user 104 viewing a merchant's product on a web page of an online marketplace). The social media data can be obtained from, for example, social media accounts or applications associated with the recipient user 104, and can indicate users who have or may have an association with the recipient user 104, can indicate interests (e.g., interests in merchants, goods, or services; hobbies or interests in sports or other activities; interests in music, movies, television programs; or other interests), and/or can indicate interactions (e.g., clicking on an online advertisement on a social media page) of the recipient user 104 with advertisements, online items, or information relating to merchants, goods, or services (e.g., on a social media page). In some embodiments, the candidate selector component 410 can receive user preference information, which can indicate, recommend, select, or express a preference for a particular merchant(s), from a user (e.g., user 108 or another user) via the user's communication device (e.g., communication device 134). For example, the user (e.g., using communication device 134) can create a message (e.g., a personal transaction note or preference message) that can include the user preference information that can indicate, recommend, select, or express a preference for a particular merchant(s) that the user desires to be assigned to the pool 124 or at least be considered (e.g., strongly considered) for assignment to the pool 124. The user can use the communication device to provide (e.g., present or communicate) such message to the candidate selector component 410.

To facilitate security of data and users, the pool management component 120 can comprise a security component 412 that can apply access rules to intrinsic information (e.g., personal data) or extrinsic information (e.g., social media data, online data, . . . ) associated with users (e.g., recipient user 104, user 108, user 110, or user 112, . . . ) or merchants (e.g., merchant 114, merchant 116, and/or merchant 118, . . . ) to control or limit access to the respective intrinsic information or extrinsic information of entities (e.g., users or merchants), in accordance with the defined pool management criteria and/or respective preferences of the respective entities with regard to the various types of intrinsic information or extrinsic information. The security component 412 can control access to and/or use of the various types of intrinsic information or extrinsic information of the respective entities by the pool management component 120 and other components of the system 100, based at least in part on the access rules.

The candidate selector component 410 can analyze the transaction data, social media data, online data, user preference information, or other data. As part of, and based at least in part on, such analysis, the candidate selector component 410 can determine respective affinities of the recipient user 104 with respect to respective merchants, respective goods, or respective services. For instance, as part of such analysis, the candidate selector component 410 can determine that the recipient user 104 has a stronger or higher affinity for one merchant (e.g., merchant 114) over another merchant (e.g., merchant 118). Based at least in part on the results of analyzing the transaction data, social media data, online data, user preference information, or other data associated with the recipient user 104, and respective affinities of the recipient user 104 with regard to respective merchants of a set of merchants (e.g., merchant 114, merchant 116, merchant 118, and/or another merchant(s)) associated with the recipient user 104, or with regard to respective products of merchants, the candidate selector component 410 can determine a subset of merchants that can be candidates (e.g., merchant candidates) to participate in the pool 124 associated with the recipient user 104.

For instance, the candidate selector component 410 can rank the respective merchants, or respective products associated with the respective merchants, based at least in part on the analysis results, including the respective affinities of the recipient user 104 with respect to the respective merchant or respective products. In certain embodiments, the candidate selector component 410 can apply respective weighting to respective attributes (e.g., affinity, type of product, cost of product, preferences (e.g., user (e.g., user 108) preference for a particular merchant, product, type of product, or cost of product, or other attribute; or recipient user preference for a particular merchant, product, type of product, or cost of product, or other attribute) associated with the merchants or products, and can generate a weighted ranking of the merchants and/or products, based at least in part on the respective weighting applied to the respective attributes, in accordance with the defined pool management criteria. In some embodiments, the candidate selector component 410 can apply a higher weighting to a user preference (e.g., preference of user 108, or preference of recipient user 104) relating to a merchant or a product than other factors or attributes (e.g., when doing so is in accordance with the defined pool management criteria).

Based at least in part on the ranking (e.g., weighted ranking) of merchants or products of merchants, from a set of merchants associated with the recipient user 104 or otherwise under consideration, the candidate selector component 410 can determine a subset of merchants (e.g., merchant 114, merchant 116, merchant 118, and/or another merchant(s)) to select to participate in the pool 124 for the event. The subset of merchants can include some merchants (e.g., merchant 114, merchant 116, merchant 118, and/or another merchant(s)), but may not include certain other merchants. For example, the candidate selector component 410 can determine and select a desired number (e.g., 5 or other desired number) of higher ranked merchants to be in the subset of merchants, in accordance with the defined pool management criteria. In some embodiments, the candidate selector component 410 can employ a filter component 414 that can filter the merchants or products of merchants, based at least in part on the respective attributes, respective weighting, and the desired number of merchants to include in the pool 124 for the event, to generate filtered results, comprising certain merchants (e.g., a portion of the merchants) that can be included in the subset of merchants (e.g., merchant candidates) for the event, while filtering out other merchants.

In response to selecting the subset of merchants, the candidate selector component 410 can assign the merchant candidates of the subset of merchants (e.g., merchant 114, merchant 116, merchant 118, and/or another merchant(s)) to the pool 124. The pool management component 120 can include a notification component 416 that can send (e.g., communicate) notification messages to the merchant candidates (e.g., merchant 114, merchant 116, and/or merchant 118, . . . ), via the respective communication devices (e.g., 140, 142, and/or 144, . . . ) to notify the merchant candidates of the pool 124 associated with the recipient user 104, the event, and the date of the event, and to inquire as to whether those merchant candidates desire to provide offers (e.g., general offers or discount offers) for their products to the pool 124.

In response to the notification messages, one or more of the merchant candidates (e.g., merchant 114, merchant 116, and/or merchant 118, . . . ), utilizing the respective communication devices (e.g., 140, 142, and/or 144, . . . ), can assign or present one or more respective potential gifts (e.g., one or more offers for products) to the pool 124 (e.g., auto-pool), as indicated at reference numeral 220 of the pool generation and management flow 200. For instance, a merchant candidate (e.g., merchant 114) can utilize a communication device (e.g., communication device 140) to communicate offer information regarding an offer (e.g., general or non-discounted offer, or a discounted offer) for a product (e.g., good or service) of or associated with the merchant candidate to the pool management component 120. With regard to each offer received from each merchant candidate (e.g., merchant 114, merchant 116, merchant 118, and/or other merchant(s)), the pool management component 120 can deposit the offer (e.g., offer information) for the product into the pool 124, for example, as indicated at reference numeral 302 of FIG. 3.

Also, as part of the jobs/services functions 214 to determine contacts for participation in the pool 124, the candidate selector component 410 can access and obtain contact user data associated with the recipient user 104 from the contact management component 106 (e.g., contact management server). The contact user data can comprise information regarding users (e.g., user 108, user 110, user 112, and/or other users) associated with (e.g., known by, friends with, acquaintances with, or related to) the recipient user 104. In some embodiments, the candidate selector component also can access social media data, online data, user preference information, or other data (e.g., demographic data or other extrinsic information) associated with the recipient (e.g., as permitted by the rules applied by the security component 412). In certain embodiments, the candidate selector component 410 can receive user preference information, which can indicate, recommend, select, or express a preference for a particular user, from a user (e.g., user 108 or another user) via the user's communication device (e.g., communication device 134). For instance, the user (e.g., using communication device 134) can create a message (e.g., a personal transaction note or preference message) that can include the user preference information that can indicate, recommend, select, or express a preference for a particular user(s) who the user desires to be invited to participate in and contribute to the pool 124 or at least be considered (e.g., strongly considered) for an invitation to participate in and contribute to the pool 124. The user can utilize the communication device to provide (e.g., present or communicate) such message to the candidate selector component 410.

The candidate selector component 410 can analyze the contact user data, social media data, online data, user preference information, or other data. As part of, and based at least in part on, such analysis, the candidate selector component 410 can determine respective affinities of the recipient user 104 with respect to respective users (e.g., user 108, user 110, user 112, and/or other users). For example, as part of such analysis, the candidate selector component 410 can determine that the recipient user 104 has a stronger or higher affinity for one user (e.g., user 110) over another user. Based at least in part on the results of analyzing the contact user data, social media data, online data, user preference information, or other data associated with the recipient user 104, and respective affinities of the recipient user 104 with regard to respective users of a set of users (e.g., user 108, user 110, user 112, and/or other users) associated with, or potentially associated with, the recipient user 104, the candidate selector component 410 can determine a subset of users who can be candidates (e.g., user candidates) to participate in the pool 124 associated with the event and recipient user 104. In certain embodiments, the candidate selector component 410 can apply a higher weighting to a user preference (e.g., preference of user 108 or other user), which can indicate or express a preference for a particular user for inclusion in the pool 124, than other factors or attributes (e.g., when doing so is in accordance with the defined pool management criteria).

In some embodiments, the candidate selector component 410 can rank the respective users, based at least in part on such analysis results, including the respective affinities of the recipient user 104 with respect to the respective users of the set of users. In certain embodiments, the candidate selector component 410 can apply respective weighting to respective attributes associated with the respective users. The attributes associated with users can comprise, for example, an affinity of the recipient user 104 to a user, a type of relation with the recipient user 104 (e.g., friend, relative (e.g., brother, sister, child, parent, grandparent, uncle, aunt, or cousin; and/or close relative or distant relative), co-worker, or business contact, . . . ), user preferences (e.g., recipient user preference for a particular user; or user preference of a user (e.g., user 108) for a particular user), age of a user, gender of a user, employment of a user, income or wealth of a user, or other desired attribute. Based at least in part on the analysis results, including the results of analyzing the respective attributes of the respective users under consideration and the respective weighting of the respective attributes, the candidate selector component 410 can generate a weighted ranking of the users (e.g., user 108, user 110, user 112, and/or other users) who have or may have an association (e.g., a relationship of some kind) with the recipient user 104, in accordance with the defined pool management criteria.

Based at least in part on the ranking (e.g., weighted ranking) of the users, from a set of users who are or may be associated with the recipient user 104 or who are otherwise under consideration, the candidate selector component 410 can determine a subset of users (e.g., user 108, user 110, user 112, and/or other users) to select to invite to participate in the pool 124 for the event. The subset of users (e.g., user candidates) can include some users (e.g., user 108, user 110, user 112, and/or another user(s)), but may not include certain other users (e.g., users who have a relatively lower level of contact or relationship with the recipient user 104, or who are otherwise determined to not be suitable candidates for this particular pool 124 and particular event). For instance, the candidate selector component 410 can determine and select a desired number (e.g., 5 or other desired number) of higher ranked users to be in the subset of users, in accordance with the defined pool management criteria. In some embodiments, the candidate selector component 410 can employ a filter component 414 that can filter the users under consideration, based at least in part on the respective attributes, respective weighting, and the desired number of users to include in the pool 124 for the event, to generate filtered results, comprising certain users (e.g., a portion of the users) who can be included in the subset of users for the event, while filtering out other users.

In response to selecting the subset of users, the candidate selector component 410 can invite the user candidates of the subset of users (e.g., user 108, user 110, user 112, and/or other user(s)) to participate in and contribute to the pool 124 for the recipient user 104 in connection with the event, as indicated at reference numeral 222 of the pool generation and management flow 200. The notification component 416 can communicate notification messages (e.g., invitation messages) to the user candidates (e.g., user 108, user 110, user 112, and/or other user(s)), via the respective communication devices (e.g., 134, 136, and/or 138, . . . ) to notify the user candidates of the pool 124 associated with the recipient user 104, the event, and the date of the event, and to invite those user candidates to contribute money, or request that those user candidates contribute money, to the pool 124 to facilitate providing or purchasing a gift(s) (e.g., good(s), service(s), or monetary gift) for the recipient user 104 in connection with the event. If one or more merchants have provided offers for products, which can be potential gifts, the notification messages also can provide information regarding such product offers and/or can invite the user candidates to access and view the pool 124 and pool-related information to see what potential gifts are available for consideration.

In response to the notification messages, one or more of the user candidates (e.g., user 108, user 110, user 112, and/or another user(s)) of the subset of users, utilizing the respective communication devices (e.g., 134, 136, and/or 138, . . . ), can contribute respective monetary funds to the pool 124 (e.g., auto-pool), as indicated at reference numeral 224 of the pool generation and management flow 200. For example, a user candidate (e.g., user 110) can utilize a communication device (e.g., communication device 136) to communicate monetary fund information, which can be an electronic representation of monetary funds, or otherwise facilitate the transfer of the monetary funds, to the pool management component 120. In some embodiments, the user candidate, using the communication device, can access a financial account of the user and can transfer money from the financial account to the pool management component 120 to contribute to the pool 124. In other embodiments, the user candidate, using the communication device, can access a financial services application (e.g., mobile money services application) and can use the application to facilitate transferring money from a financial account associated with (e.g., linked to or registered with) the application to the pool management component 120 to contribute to the pool 124. With regard to each contribution of monetary funds received from each user candidate (e.g., user 108, user 110, user 112, and/or other user(s)), the pool management component 120 can deposit the monetary funds (e.g., monetary fund information) for such user's contribution into the pool 124, for example, as indicated at reference numeral 304 of FIG. 3. For instance, the monetary funds contributed to the pool 124 by the users can be stored in the fundraiser component 130 (e.g., in a pool profile associated with the pool 124) of the pool component 122.

The pool management component 120 also can comprise a tracking component 418 that can track respective activity associated with respective pools (e.g., pool 124, pool, 126, and/or pool 128, . . . ) that can be associated with respective recipient users (e.g., recipient user 104) in connection with respective events. For instance, with regard to the pool 124, the tracking component 418 can track contributions of monetary funds (e.g., electronic monetary funds) to the pool 124 that are received from user candidates (e.g., user 108, user 110, user 112, and/or other user(s)) of the subset of users, as such pool 124 (e.g., pool profile of the pool 124) and associated monetary funds are stored the fundraiser component 130 of the pool component 122, which can store the respective pools (e.g., respective pool profiles of the respective pools 124, 126, and/or 128, . . . ) associated with respective recipient users (e.g., recipient user 104) and respective event. The tracking component 418 also can track offers (e.g., general offers or discount offers) received from merchant candidates (e.g., merchant 114, merchant 116, merchant 118, and/or other merchant(s)) of the subset of merchants and deposited in the appropriate pool (e.g., pool 124).

Based at least in part on the tracking of the activity associated with pools (e.g., pool 124), the notification component 416 can provide (e.g., communicate) updates (e.g., update messages) to the user (e.g., user 108 via communication device 134) who initiated the pool 124 for the recipient user 104 and/or the other user candidates (e.g., user 110 via communication device 136, and/or user 112 via communication device 138) to update the user candidate(s) regarding the status of the pool 124, including how much money is in the pool 124, what offers have been provided to the pool 124 by merchant candidates, and/or how much more money is needed to reach a desired monetary goal (e.g., to purchase a particular product), etc. The notification component 416 also can keep users (e.g., users 108, 110, and/or 112, . . . ) and/or merchants (e.g., merchants 114, 116, and/or 118, . . . ) updated regarding how much time is remaining to make contributions to the pool 124 or present offers to the pool 124, respectively, before the pool 124 closes or ends via update messages (e.g., communicated to their respective communication devices or electronic messaging accounts) and/or via a countdown timer that can be displayed on an interface (e.g., an application interface or website interface) in proximity to or in connection with the pool 124 (e.g., a visual representation of the pool 124). For instance, the notification component 416 can display or facilitate displaying, via an interface, a countdown timer in proximity to or in connection with the pool 124, wherein the countdown timer can display how much time is remaining until the pool 124 is closed or ended, and will stop accepting contributions or offers, in order to keep the users and/or merchants informed regarding how much time remains to make contributions to the pool 124 or present offers to the pool 124, respectively.

In some embodiments, the pool management component 120 can include a gift determination component 420 that can determine or infer potential gifts, and/or can determine and select a gift(s), such as a gift for a good or service, or at least an offer (e.g., discounted offer) for the good or service, provided (e.g., presented) to the pool 124 by a merchant candidate (e.g., merchant 114), in accordance with the defined pool management criteria. For instance, the gift determination component 420 (e.g., by itself or in conjunction with another component, such as an AI component) can analyze information relating to the recipient user 104, goods, services, merchants (e.g., merchant 114, merchant 116, merchant 118, and/or other merchant(s)), the amount of money in the pool 124, the respective offers or discounts presented by respective merchants, the respective costs (e.g., purchase prices) of respective goods or services, preference information (e.g., preference information relating to goods or services) associated with the pool 124, attributes (e.g., characteristics) of the recipient user 104, etc. As part of the analysis, the gift determination component 420 can take into account one or more factors of a set of factors to facilitate determining or inferring a gift or potential gift with respect to the recipient user 104. The set of factors can comprise, for example, respective affinities of the recipient user (e.g., recipient user 104) to respective goods, services, or merchants, an amount of monetary funds in the pool (e.g., pool 124), respective amounts of discount associated with the respective goods or services, gift preference information associated with the pool, attributes of the recipient user, or a context of the recipient user or the event.

Based at least in part on the results of such analysis of the information and the set of factors, the gift determination component 420 can determine a context of the recipient user 104 or the event, and, from the analysis results and the context, can determine or infer one or more gifts or potential gifts (e.g., a gift for a good or service associated with a merchant) that can be recommended for purchase or can be purchased using the monetary funds in the pool 124. If the gift determination component 420 determines more than one gift or potential gift can be desirable by or for the recipient user 104, the gift determination component 420 can rank the respective gift items, based at least in part on the analysis results and the set of factors. In certain embodiments, the gift determination component 420 can apply respective weights to respective factors or sub-factors (e.g., respective attributes of the recipient user) of the set of factors. Based at least in part on the analysis results, the set of factors, and the respective weighting of the factors or sub-factors, the gift determination component 420 can determine a weighted ranking of gift items, wherein respective gift items can have respective weighted scores.

In some embodiments, the notification component 416 can communicate a recommendation message, which can recommend a gift or potential gift be selected for the recipient user 104 (e.g., as determined or inferred by the gift determination component 420), to communication devices (e.g., 134, 136, and/or 138, . . . ) of the users (e.g., user 108, user 110, user 112, and/or other user(s)) in the subset of users. Additionally or alternatively, the gift determination component 420 can indicate the recommendation for the gift or potential gift in the pool 124, and, when the recipient user 104 views the pool (e.g., after unmasking of the pool 124) or when users of the subset of users view the pool 124, such user(s) can see the recommendation for the gift or potential gift (and/or a ranking of various other potential gifts to be considered by or for the recipient user 104).

In some embodiments, the pool management component 120, employing the notification component 416, can notify the recipient user 104 about the pool 124 and the gift (e.g., gift or gift options), for example, at the time of the event, as more fully described herein. In other embodiments, the user candidate(s) (e.g., user 108, user 110, and/or user 112) may decide to select an offer for a good or service of a merchant from the pool 124, purchase such good or service, and have the good or service delivered to the recipient user 104 at or near the time of the event or to one of the user candidates (e.g., user 108) before the time of the event, as more fully described herein.

For instance, in certain embodiments, if the pool management component 120 is authorized (e.g., by the user 108 who initiated the creation of the pool 124) to determine and/or purchase the gift(s) for the recipient user 104, the pool management component 120 can initiate and perform the purchase of the gift(s) (e.g., the good or service that is the gift), as determined by the pool management component 120 (e.g., as determined by the gift determination component 420). For example, the user 108 who initiated the creation of the pool 124 and/or the other user candidates can decide or agree that there is a particular gift (e.g., good or service of a merchant and/or associated discount offer) the user(s) desire to purchase when there is sufficient money in the pool 124 to cover the purchase price of the particular gift. The user 108 can authorize the pool management component 120 to purchase (e.g., automatically purchase) the particular gift, the good or service, from the merchant (e.g., merchant 114) once there is sufficient money (e.g., a threshold amount of money) in the pool 124 to cover the purchase price, and/or other associated costs (e.g., shipping, handling, or sales tax, . . . ), associated with the purchase of the particular gift from the merchant.

To facilitate purchasing goods or services from merchants, the pool management component 120 can comprise a provisioning component 422 that can allocate monetary funds in pools to make payments from the funds in the pools to purchase goods or services from merchants, in accordance with the defined pool management criteria. For instance, with regard to the pool 124, the tracking component 418 can track contributions to the pool 124 and the amount of money in the pool 124. In response to determining that the pool 124 has sufficient monetary funds to purchase the particular gift for the recipient user 104, as selected by the user(s) (e.g., user 108, user 110, and/or user 112) of the subset of users, and in response to determining that the user(s) authorized the pool management component 120 to purchase the particular gift (e.g., automatically, without further input from the user(s)), the provisioning component 422 can access the appropriate amount of monetary funds from the pool 124 and can provide (e.g., send) the monetary funds to the merchant (e.g., merchant 114), for example, via the communication device (e.g., communication device 140) of the merchant and/or website or online marketplace associated with the merchant, to purchase the particular gift (e.g., the particular good or service) from the merchant in accordance with the offer (e.g., discount offer) of the merchant. The provisioning component 422 or another component of the pool management component 120 can provide the merchant with other desired information, such as shipping or delivery information (e.g., the residential address to which to ship the good or service, an email address or message account (e.g., text message account or social media account) associated with the recipient user 104 or user candidate (e.g., user 108) to which to send information regarding the good or service), or an event-related message (e.g., a personal message to the recipient user 104 from the user candidates to commemorate or celebrate the event), in connection with the purchase of the particular gift. The merchant (e.g., merchant 114) can provide the particular good or service to the desired destination (e.g., residential address, email address, or message account), for example, at the time of the event (or as otherwise instructed), in accordance with the purchase agreement, shipping or delivery instructions, and/or event-related message instructions.

If the pool management component 120 is not authorized to automatically make the purchase of a gift, when the gift (e.g., offer for good or service) is selected from the pool 124 by the recipient user 104 at or after the time of the event, or by a user candidate(s) (e.g., user 108 and/or another user(s)) prior to the event, the recipient user 104 or user candidate can instruct the pool management component 120 to purchase the selected gift from the associated merchant (e.g., merchant 114). In response to such purchase instructions, the provisioning component 422 can access the appropriate amount of monetary funds from the pool 124 and can provide the monetary funds to the merchant (e.g., merchant 114), for example, via the communication device (e.g., communication device 140) of the merchant and/or website or online marketplace associated with the merchant, to purchase the selected gift (e.g., the selected good or service) from the merchant in accordance with the offer (e.g., discount offer) of the merchant. The pool management component 120 also can make shipping or delivery arrangements to facilitate delivery of the selected good or service to the desired destination (e.g., residential address, email address, or message account) associated with the recipient user 104 or user candidate (e.g., user 108) at the desired time (e.g., at the time of the event), per the instructions received from such user.

With further regard to notifying the recipient user 104 about the gift (e.g., gift or gift options) and the pool 124 (e.g., where the gift has not been shipped to the recipient user 104 or user candidate), at (or near) the time of the event, the masking component 408 can unhide (e.g., unmask) the pool 124 and pool-related information to enable the recipient user 104 and/or associated communication device 132 to access and view the pool 124, the gift, and other pool-related information, as indicated at reference numeral 226 of the pool generation and management flow 200. For instance, the masking component 408 can remove the mask to discontinue the concealing of the pool and pool-related information from the recipient user 104 and associated communication device 132.

The notification component 416 can send a gift notification message to the recipient user 104 to notify the recipient user 104 of the gift and associated pool 124, as indicated at reference numeral 228 of the pool generation and management flow 200. For example, the notification component 416 can communicate a gift notification message to the communication device or an electronic messaging account (e.g., email account, text message account, or social media account) of the recipient user 104 to notify the recipient user 104 of the gift and associated pool 124.

With the pool 124 and pool-related information unmasked, and in response to the gift notification message, the recipient user 104 (e.g., pool recipient 230), for example, using communication device 132, can view the pool 124 and pool details (e.g., gift details and other pool-related information), and can accept the monetary funds and/or gift, as indicated at reference numeral 232 of the pool generation and management flow 200. The pool management component 120 can comprise a presentation component 424 that can provide (e.g., present or display) various interfaces (e.g., application interfaces or website interfaces) that can facilitate enabling the recipient user 104 to view of pool 124 and pool related information (e.g., via the communication device 132) and presenting the recipient user 104 and associated communication device 132 information relating to the pool 124. For instance, using the communication device 132, and via the presentation component 424, the recipient user 104 can view the gift purchased using some or all of the pool funds (if a gift has already been purchased), or can view the available gift options (e.g., respective offers for goods or services presented by the respective merchant candidates (e.g., merchant 114, merchant 116, merchant 118, and/or other merchant(s)) and the monetary funds available for use in purchasing one or more of the gift options, if desired by the recipient user 104.

As desired, using the communication device 132, and via the presentation component 424, the recipient user 104 can transfer the monetary funds and/or use, access, or transfer the desired gift(s) (e.g., good or service) obtained from the merchant(s) (e.g., merchant 114), if any gift was selected and/or purchased (e.g., by the recipient user 104 or user candidate), as indicated at reference numeral 234 of the pool generation and management flow 200.

With further regard to selection of merchants to participate in a pool (e.g., pool 124) and/or determination of gift options (e.g., offers or discounts for goods or services), in accordance with various embodiments, the pool management component 120 can have merchants (e.g., merchant 114, merchant 116, merchant 118, and/or other merchants) compete for business (e.g., compete against other merchants to try to get the recipient user 104 or user candidate to accept its offer for a good or service over another offer(s) for a same, similar, or different good or service presented by another merchant(s)) with regard to a pool (e.g., pool 124) associated with a recipient user 104 and event. With regard to a pool 124 associated with the recipient user 104 and the event, merchants selected to be in the subset of merchants that are invited to participate in the pool 124, and/or even merchants that were not initially invited to participate in the pool 124 by the pool management component 120, can view all or some of the pool-related information in the pool. Such pool-related information can comprise information (e.g., intrinsic or extrinsic information) regarding the recipient user 104 and/or the users (e.g., user 108, user 110, user 112, and/or another user(s)) in the subset of users, information relating to merchants (e.g., merchant 114, merchant 116, merchant 118, and/or other merchants) of the subset of merchants, including respective offers or discounts on goods or services presented to the pool 124 and users by the respective merchants, and/or other pool-related information associated with the pool 124. The security component 412 can apply the access rules to the pool 124 and pool-related information to control access to and secure the pool 124 and pool-related information, in accordance with the defined pool management criteria and/or user preferences, as more fully described herein.

In reviewing the pool-related information of the pool 124 (e.g., as controlled and permitted by the security component 412), a merchant (e.g., merchant 118, or another merchant that is not in the subset of merchants associated with the pool 124) can view the offers for goods and services provided to the pool 124 by the other merchants (e.g., merchant 114), and, if desired, can try to compete for the business of the recipient user 104 or user candidate of the pool 124, for instance, by trying to make a better offer on a same, similar, or different good or service (e.g., offer a higher discount or a lower price on a same or similar good or service; and/or offer additional goods or services, or additional benefits (e.g., a longer or better product warranty, technical support, or repair or maintenance services, . . . ), in connection with the same or similar good or service; and/or offer a desirably low price or high discount on a different good or service), as compared to the offers for goods or services of other merchants in the pool 124.

For example, if the recipient user 104 is a musician who has an interest in musical equipment, based at least in part on the results of analyzing the intrinsic and extrinsic information associated with the recipient user 104, the pool management component 120 initially can invite a subset of merchants (e.g., merchant 114, merchant 116, merchant 118, and/or another merchant(s)) to participate in the pool 124, wherein the merchant 114 and merchant 118 can be sellers of musical equipment. The merchant 114 and merchant 118 can provide respective offers (e.g., discount offers) for respective musical equipment (e.g., same or similar musical equipment) to the pool 124, wherein the offer provided by the merchant 114 can have a higher discount/lower price for the musical equipment than the offer for the same or similar musical equipment provided by the merchant 118. The merchant 118, using communication device 144, can view the pool-related information of the pool 124 and can see that the merchant 114 has provided an offer that has a higher discount/lower price for the musical equipment than the offer on same/similar musical equipment provided by the merchant 118 to the pool 124. With such knowledge regarding the respective offers, the merchant 118 can decide whether or not to present an updated offer for the same/similar musical equipment that matches or is better (e.g., has an even higher discount or even lower price) than the offer provided by the merchant 114. If the merchant 118 decides to present the updated offer (e.g., the matching or better offer), the merchant 118, using the communication device 144, can present the updated offer for the same/similar musical equipment to the pool management component 120, and the pool management component 120 can deposit (e.g., store) the updated offer in the pool 124.

Additionally or alternatively, another merchant, which is another musical equipment seller that is not in the subset of merchants associated with the pool 124, can view the pool-related information of the pool 124 (e.g., if and as permitted by the security component 412 and associated rules and user preferences). Similar to the merchant 118, the other merchant can see what the respective offers are for the same/similar musical equipment as provided by the merchants 114 and 118. The other merchant can decide whether to try to compete with merchants 114 and 118, and make a matching or better offer than merchants 114 and 118 for the same/similar musical equipment that can be provided to the pool 124 (if permitted by the pool management component 120 and/or user candidate(s) (e.g., user 108) associated with the pool 124). If the other merchant decides to make a matching or better offer for the same/similar musical equipment to the pool 124, the other merchant, using a communication device, can send a request message to the pool management component 120 to request to be permitted to participate in the pool 124 and present the matching or better offer for the same/similar equipment. In some embodiments, the pool management component 120 can communicate the request message to the user candidate(s) (e.g., user 108, user 110, and/or user 112) of the pool 124 for consideration and/or approval (or disapproval) by the user candidate(s), unless the user candidate(s) gave pre-approval or pre-authorization to allow the pool management component 120 discretion to add other merchants to the pool 124). If the pool management component 120 or user candidate(s) (as applicable) approves of granting the request to be added to the pool 124, the pool management component 120 can allow the other merchant to be added to the subset of merchants of the pool 124 and allow the other merchant to provide the matching or better offer for the same/similar musical equipment to the pool 124. In response to receiving such matching or better offer from the communication device of the other merchant, the pool management component 120 can deposit (e.g., store) the matching or better offer for the same/similar musical equipment of the other merchant into the pool 124, where such offer can be considered by the user candidates of the subset of users and/or the recipient user 104 (when the recipient user 104 is able to view the pool 124 and offers therein at or after the time of the event).

The pool management component 120 also can comprise a processor component 426 that can work in conjunction with the other components (e.g., registration component 402, event generator component 404, pool generator component 406, masking component 408, candidate selector component 410, . . . , and data store 428) to facilitate performing the various functions of the pool management component 120. The processor component 426 can employ one or more processors, microprocessors, or controllers that can process data, such as information relating to pools, events, users (e.g., recipient users, users, and/or merchants, . . . ), goods, services, offers, gifts, fundraising, monetary funds, communication devices, attributes associated with users, the set of factors, identifiers or authentication credentials associated with users or communication devices, messages metadata, messages, data parsing, data filtering, data or user security, masking of pools, parameters, traffic flows, policies, defined pool management criteria, algorithms (e.g., pool management algorithms, filtering algorithms, AI algorithms, machine learning algorithms, etc., including as one or more of these algorithms are expressed in the form of the methods and techniques described herein), protocols, interfaces, tools, and/or other information, to facilitate operation of the pool management component 120, as more fully disclosed herein, and control data flow between the pool management component 120 and other components (e.g., a communication device, a base station or other network component or device of the communication network, data sources, applications, . . . ) associated with the pool management component 120.

The data store 428 can store data structures (e.g., user data, metadata), code structure(s) (e.g., modules, objects, hashes, classes, procedures) or instructions, information relating to pools, events, users (e.g., recipient users, users, and/or merchants, . . . ), goods, services, offers, gifts, fundraising, monetary funds, communication devices, attributes associated with users, the set of factors, identifiers or authentication credentials associated with users or communication devices, messages metadata, messages, data parsing, data filtering, data or user security, masking of pools, parameters, traffic flows, policies, defined pool management criteria, algorithms (e.g., pool management algorithms, filtering algorithms, AI algorithms, machine learning algorithms, etc., including as one or more of these algorithms are expressed in the form of the methods and techniques described herein), protocols, interfaces, tools, and/or other information, to facilitate controlling operations associated with the pool management component 120. In an aspect, the processor component 426 can be functionally coupled (e.g., through a memory bus) to the data store 428 in order to store and retrieve information desired to operate and/or confer functionality, at least in part, to the registration component 402, event generator component 404, pool generator component 406, masking component 408, candidate selector component 410, . . . , and data store 428, etc., and/or substantially any other operational aspects of the pool management component 120.

Figure 5:
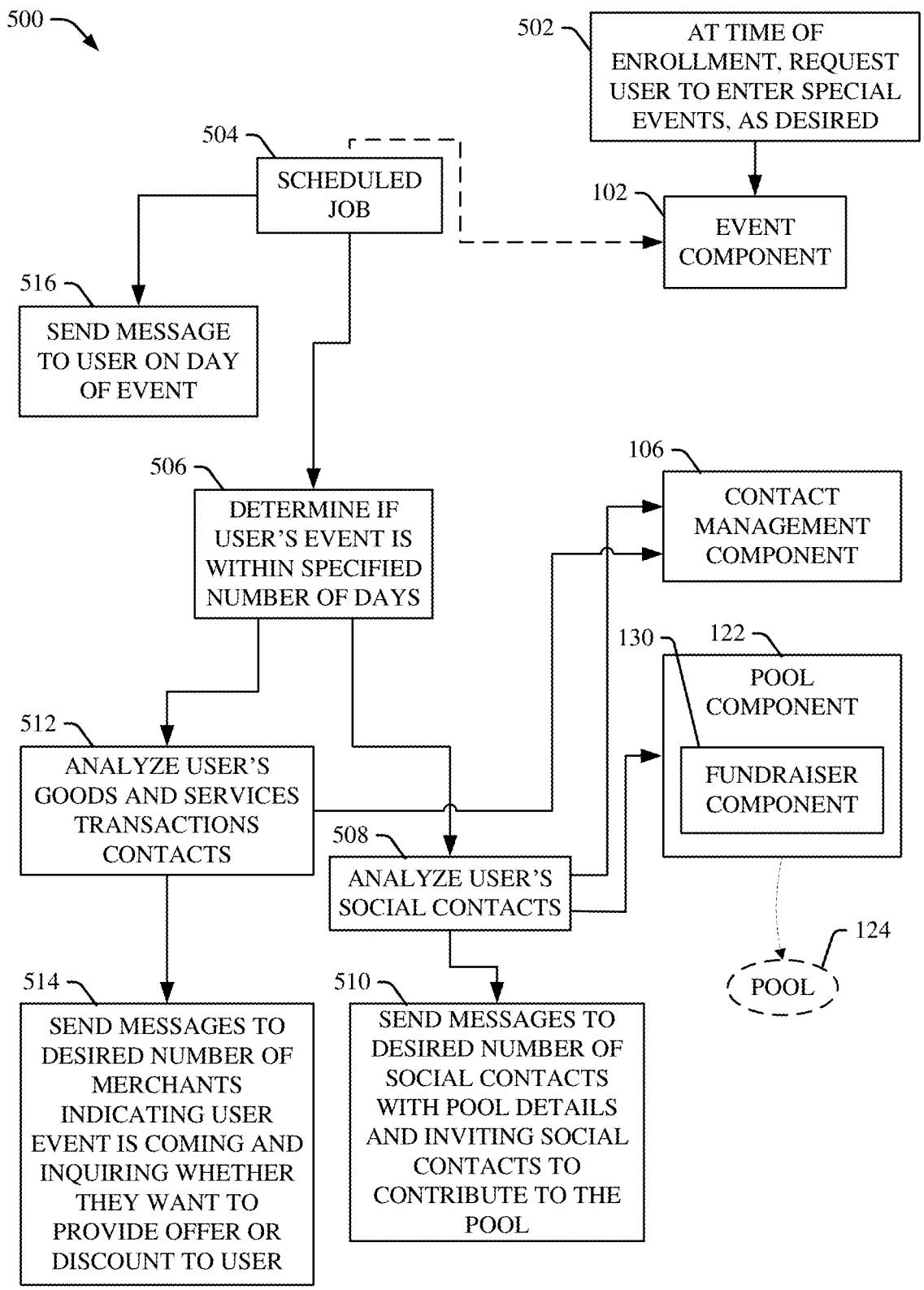
FIG. 5 illustrates a diagram of example, non-limiting pool generation and management task flow that can facilitate generation and management of a pool associated with an event and recipient user, in accordance with various aspects and embodiments described herein.

Referring to FIG. 5 (along with FIGS. 1 and 4), FIG. 5 illustrates a diagram of example, non-limiting pool generation and management task flow 500 that can facilitate generation and management of a pool associated with an event and recipient user, in accordance with various aspects and embodiments described herein. In various aspects, the pool generation and management task flow 500 can be facilitated or performed by the system 100.

In accordance with the example pool generation and management task flow 500, at the time of enrollment or registration of a user (e.g., user 108, or recipient user 104) with the financial service generally or the pooling service (e.g., pooling and fundraising service) specifically, the pool management component 120 can request the user to enter one or more special events, as desired by the user, as indicated at reference numeral 502. Such information relating to the special events (e.g., birthday, wedding anniversary, holiday, or school-related event, . . . ) selected by the user can be stored in the event component 102.

In accordance with the example pool generation and management task flow 500, as generated and managed by the pool management component 120, there can be a scheduled job 504 to facilitate generating and managing a pool 124 in connection with an event and associated recipient user 104. As part of the scheduled job 504, the pool management component 120 can access the event-related information stored in the event component 102, and can track time in relation to the event and tasks that are to be performed in connection with the event and associated pool. As indicated at reference numeral 506, the pool management component 120 can determine whether the event associated with the recipient user is set to occur within a specified number of days, based at least in part on event-related information obtained from the event component 102.

In response to determining that the event associated with the recipient user is set to occur within the specified number of days, and as part of pool generation and management, as indicated at reference numeral 508, the pool management component 120 can analyze social contacts of the recipient user 104 based at least in part on contact user data that the pool management component 120 can obtain from the contact management component 106. The pool management component 120 can determine a subset of users, comprising a desired number of users, to invite to participate in the pool 124, based at least in part on the analysis of the social contacts of the recipient user. The pool management component 120 also can generate the pool 124 associated with the recipient user 104, as well as the subset of users who can participate in the pool, and can set the end time (e.g., end date) for the pool 124 to be the time of the event, as determined from the event-related information obtained from the event component 102. The pool 124 (e.g., a pool profile for the pool 124) can be stored in the fundraiser component 130 of the pool component 122.

As depicted at reference numeral 510, the pool management component 120 (e.g., employing the notification component 416) can send notification messages to the desired users (e.g., social contacts) in the subset of users (e.g., 108, 110, and/or 112, . . . ), for example, via their respective communication devices (e.g., 134, 136, and/or 138, . . . ), to provide those users with details regarding the pool 124 and the event, and invite those users to contribute money to the pool to facilitate providing a gift (e.g., monetary gift and/or a good or service that can be purchased using the money in the pool 124) to the recipient user in connection with the event. The pool management component 120 can receive respective monetary contributions from the respective users of the subset of users, and can deposit those respective monetary contributions into the pool 124, as more fully described herein.

As indicated at reference numeral 512, the pool management component 120 can analyze transaction contacts (e.g., merchant contacts) with regard to transactions for goods and services between the recipient user 104 and various merchants, based at least in part on transaction data relating to such transactions that the pool management component 120 can obtain from the contact management component 106. Based at least in part on the results of such analysis, the pool management component 120 can determine a subset of merchants, comprising a desired number of merchants, to contact to inquire as to whether they desire to participate in the pool 124 in connection with the event associated with the recipient user 104.

As depicted at reference numeral 514, the pool management component 120 (e.g., employing the notification component 416) can send notification messages to the desired merchants (e.g., merchant candidates) in the subset of merchants (e.g., 114, 116, and/or 118, . . . ), for example, via their respective communication devices (e.g., 140, 142, and/or 144, . . . ), indicating that the event associated with the recipient user 104 is upcoming and inquiring whether those merchants want to provide an offer or discount for a good or service to the recipient user 104 in connection with the pool 124 and event, wherein any offer or discount received from a merchant can be deposited in the pool 124 by the pool management component 120.

At the time of the event, the pool management component 120 can unhide (e.g., unmask) the pool 124 and pool-related information with respect to the recipient user 104 and associated communication device 132 to enable the recipient user 104 to view the pool 124 and pool-related information. Also, as indicated at reference numeral 516, as part of executing the scheduled job 504, the pool management component 120 (e.g., employing the notification component 416) can send a gift notification message to the communication device 132 or electronic messaging account of the recipient user 104 to notify the recipient user 104 about the gift and associated pool 124.

The recipient user 104, using the communication device 132, and via the presentation component 424, can view the pool 124 and pool-related information, including information regarding the monetary funds and/or gift options (e.g., offers for goods or services provided by merchant candidates (e.g., merchant 114, merchant 116, and/or merchant 118)) in the pool 124. As desired, using the communication device 132, and via the presentation component 424, the recipient user 104 can transfer the monetary funds and/or use or transfer the desired gift(s) (e.g., good or service) obtained from the merchant(s) (e.g., merchant 114), if any gift was selected and/or purchased (e.g., by the recipient user 104 or user candidate), such as described herein.

Figure 6:
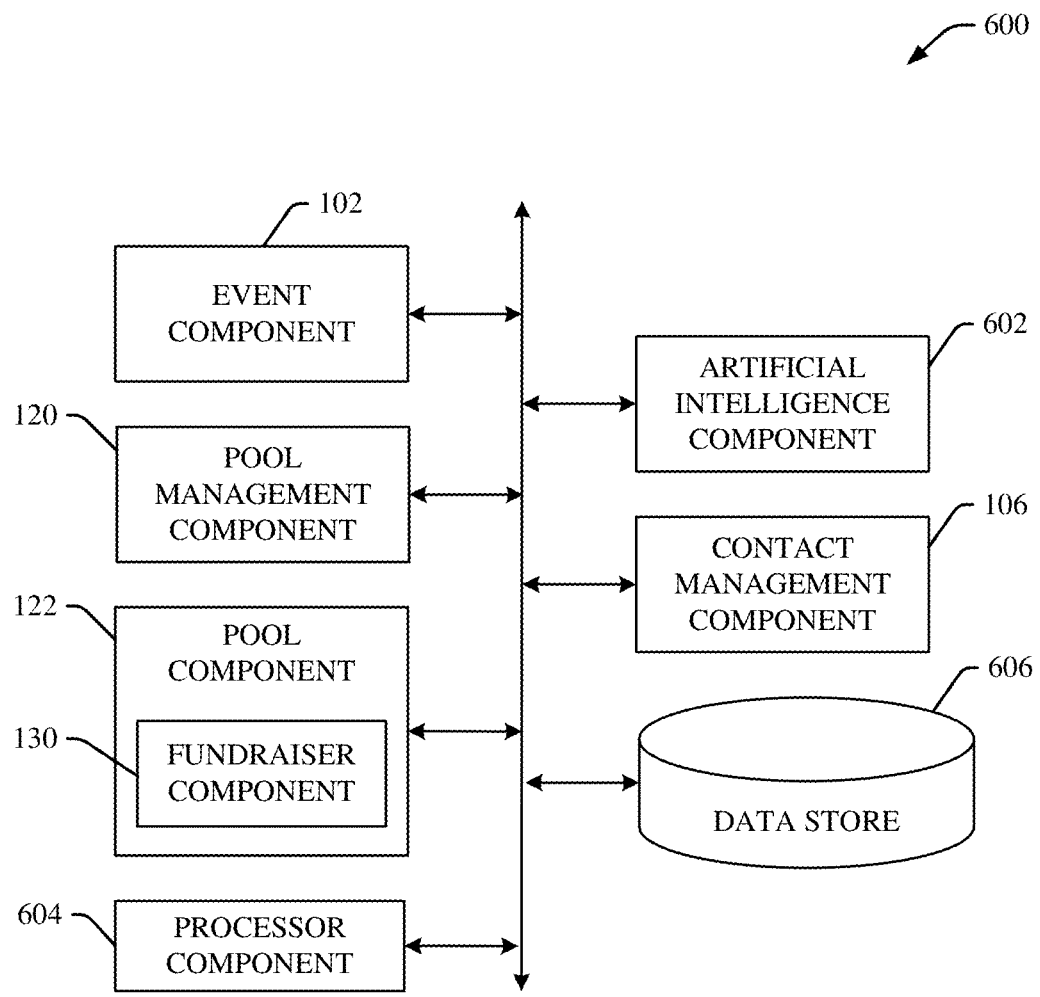
FIG. 6 depicts a block diagram of an example, non-limiting system that can employ artificial intelligence techniques to facilitate generation and management of pools associated with events and recipient users, in accordance with various aspects and embodiments of the disclosed subject matter.

FIG. 6 depicts a block diagram of an example, non-limiting system 600 that can employ artificial intelligence techniques to facilitate generation and management of pools associated with events and recipient users, in accordance with various aspects and embodiments of the disclosed subject matter. The system 600 can comprise the event component 102, contact management component 106, pool management component 120, pool component 122, and fundraiser component 130, which can respectively function and operate, as more fully described herein.

In accordance with various embodiments, the system 600 can comprise an artificial intelligence (AI) component 602 that can be associated with (e.g., communicatively connected to) the other components (e.g., event component 102, contact management component 106, pool management component 120, and/or pool component 122) of the system 600 to enable the AI component 602 communicate with such other components and facilitate performance of operations by the system 600. The AI component 602 can employ artificial intelligence techniques and algorithms, and/or machine learning techniques and algorithms, to facilitate determining or inferring users (e.g., social contacts) associated with a recipient user that are to be selected to invite to participate in a pool associated with the recipient user in connection with an event, determining or inferring merchants associated with a recipient user that are to be selected to invite to participate in a pool associated with the recipient user in connection with an event, determining or inferring a gift item (e.g., gift for a good or service associated with a merchant, or a gift in the form of an offer or discount for a good or service provided by a merchant) that can be selected, purchased, or recommended with regard to a pool associated with the recipient user in connection with an event, and/or automating one or more functions or features of the disclosed subject matter, as more fully described herein.

The AI component 602 can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) described herein with regard to the disclosed subject matter, the AI component 602 can examine the entirety or a subset of the data (e.g., data in the event component 102, contact management component 106, pool management component 120, or pool component 122; or social media data, demographic data, or other extrinsic data) to which it is granted access and can provide for reasoning about or determine states of the system and/or environment from a set of observations as captured via events and/or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes and/or systems (e.g., support vector machines, neural networks, expert systems, Bayesian belief networks, fuzzy logic, data fusion engines, and so on) in connection with performing automatic and/or determined action in connection with the claimed subject matter. Thus, classification schemes and/or systems can be used to automatically learn and perform a number of functions, actions, and/or determinations.

A classifier can map an input attribute vector, z=(z1, z2, z3, z4, zn), to a confidence that the input belongs to a class, as by f(z)=confidence(class). Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence, any of which can be employed. Classification as used herein also is inclusive of statistical regression that is utilized to develop models of priority.

In accordance with various embodiments, the system 600 also can comprise a processor component 604 that can work in conjunction with the other components (e.g., event component 102, contact management component 106, pool management component 120, pool component 122, AI component 602, . . . , and data store 606) to facilitate performing the various functions of the system 600. The processor component 604 can employ one or more processors, microprocessors, or controllers that can process data, such as information relating to pools, events, users (e.g., recipient users, users, and/or merchants, . . . ), goods, services, offers, gifts, fundraising, monetary funds, communication devices, attributes associated with users, the set of factors, identifiers or authentication credentials associated with users or communication devices, messages metadata, messages, data parsing, data filtering, data or user security, masking of pools, parameters, traffic flows, policies, defined pool management criteria, algorithms (e.g., pool management algorithms, filtering algorithms, AI algorithms, machine learning algorithms, etc., including as one or more of these algorithms are expressed in the form of the methods and techniques described herein), protocols, interfaces, tools, and/or other information, to facilitate operation of the system 600, as more fully disclosed herein, and control data flow between the system 600 and other components (e.g., a communication device, a base station or other network component or device of the communication network, data sources, applications, . . . ) associated with the system 600.

The data store 606 can store data structures (e.g., user data, metadata), code structure(s) (e.g., modules, objects, hashes, classes, procedures) or instructions, information relating to pools, events, users (e.g., recipient users, users, and/or merchants, . . . ), goods, services, offers, gifts, fundraising, monetary funds, communication devices, attributes associated with users, the set of factors, identifiers or authentication credentials associated with users or communication devices, messages metadata, messages, data parsing, data filtering, data or user security, masking of pools, parameters, traffic flows, policies, defined pool management criteria, algorithms (e.g., pool management algorithms, filtering algorithms, AI algorithms, machine learning algorithms, etc., including as one or more of these algorithms are expressed in the form of the methods and techniques described herein), protocols, interfaces, tools, and/or other information, to facilitate controlling operations associated with the system 600. In an aspect, the processor component 604 can be functionally coupled (e.g., through a memory bus) to the data store 606 in order to store and retrieve information desired to operate and/or confer functionality, at least in part, to the event component 102, contact management component 106, pool management component 120, pool component 122, AI component 602, . . . , and data store 606, etc., and/or substantially any other operational aspects of the system 600.

Figure 7:
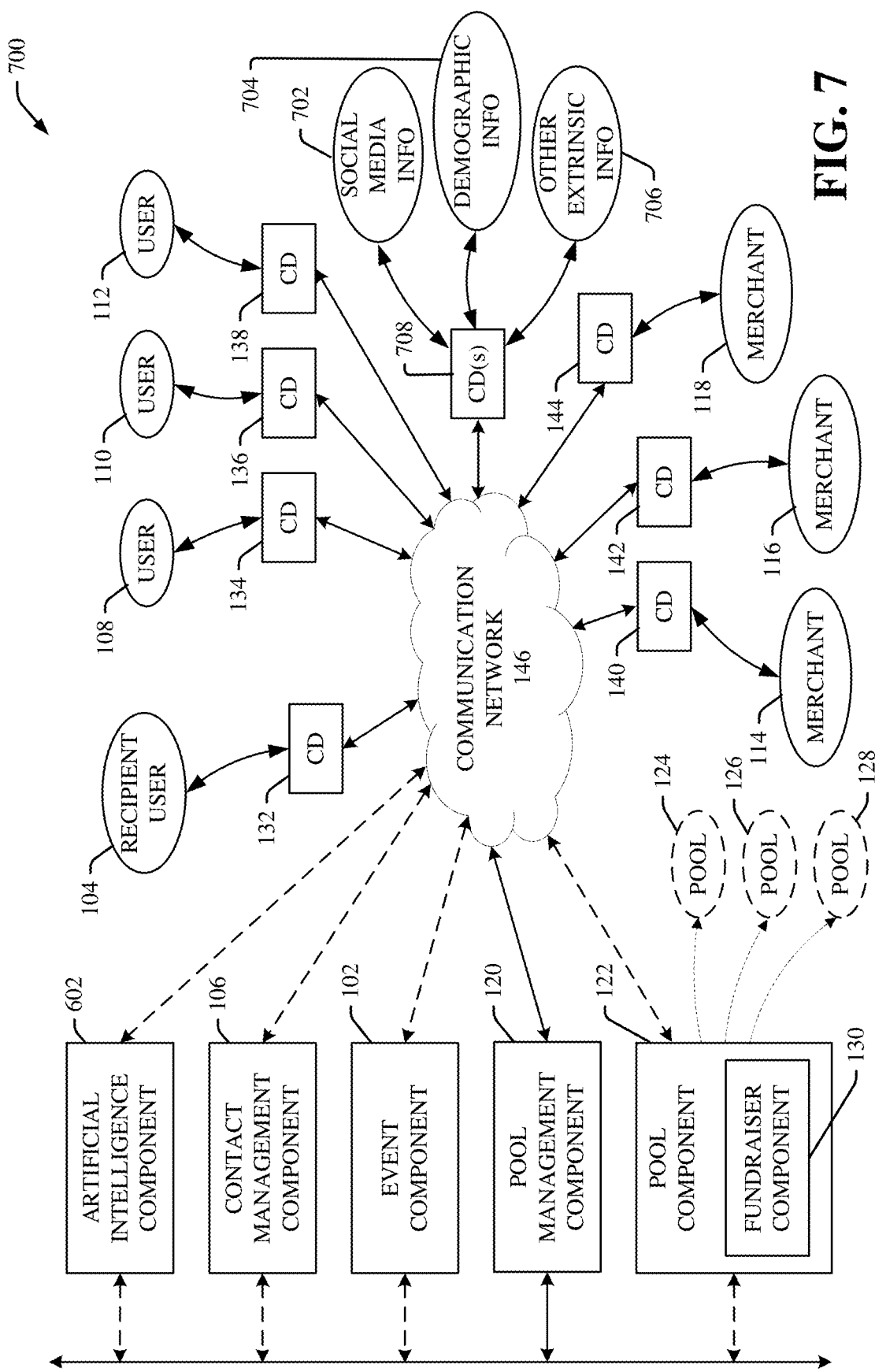
FIG. 7 illustrates a block diagram of an example, non-limiting system that can employ artificial intelligence techniques, and utilize social media information and other extrinsic information, to facilitate desirable generation and management of pools in connection with events and recipient users, in accordance with various aspects and embodiments of the disclosed subject matter.

To further illustrate various aspects of the pool management component 120 and the AI component 602, FIG. 7 illustrates a block diagram of an example, non-limiting system 700 that can employ artificial intelligence techniques, and utilize social media information and other extrinsic information, to facilitate desirable generation and management of pools in connection with events and recipient users, in accordance with various aspects and embodiments of the disclosed subject matter. The system 700 can comprise the event component 102, contact management component 106, pool management component 120, and pool component 122, which can include the fundraiser component 130. The pool management component 120 can generate and manage various pools, such as pool 124, pool 126, and pool 128, which can be associated with respective events and respective recipient users. The system 700 also can include the communication devices 132, 134, 136, 138, 140, 142, and 144 that can respectively be associated with (e.g., used by) the recipient user 104, user 108, user 110, user 112, merchant 114, merchant 116, and merchant 118. The system 700 further can include the communication network 146, wherein, at various desired times, one or more of the communication devices 132, 134, 136, 138, 140, 142, and/or 144 can be associated with (e.g., communicatively connected to) the communication network 146. The system 700 also can include the AI component 602.

In connection with generation and management of a pool, such as pool 124, in connection with an event associated with the recipient user 104, the pool management component 120 and/or AI component 602 can access contact data relating to users (e.g., user 108, user 110, user 112, and/or other users), transaction data relating to transactions associated with the recipient user 104 and merchants (e.g., merchant 114, merchant 116, merchant 118, and/or other merchants), from the contact management component 106, such as more fully described herein. In some embodiments, the pool management component 120 and/or AI component 602 can obtain extrinsic information, such as social media information 702, demographic information 704, and/or other extrinsic information 706 (e.g., other online data) associated with users, including the recipient user 104 and/or the users 108, 110, or 112, from one or more data sources via one or more communication devices, such as communication device(s) 708, which can be associated with the communication network 146.

The pool management component 120 (e.g., employing the security component 412) can apply access rules to intrinsic information (e.g., personal data, contact data, and/or transaction data) or extrinsic information (e.g., social media data, online data, . . . ) associated with users (e.g., recipient user 104, user 108, user 110, or user 112, . . . ) or merchants (e.g., merchant 114, merchant 116, and/or merchant 118, . . . ) to control or limit access to the respective intrinsic information or extrinsic information of entities (e.g., users or merchants), in accordance with the defined pool management criteria and/or respective preferences of the respective users with regard to the various types of intrinsic information or extrinsic information. The pool management component 120 can control access to and/or use of the various types of intrinsic information or extrinsic information of the respective users by the pool management component 120 and other components (e.g., AI component 602) of the system 700, based at least in part on the access rules.

The pool management component 120 and/or AI component 602 can analyze the contact data, the transaction data, and/or the extrinsic information (e.g., social media information 702, demographic information 704, and/or other extrinsic information 706) to facilitate making various determinations or inferences and/or performing various actions in connection with generating, operating, and managing the pool 124 in connection with the event. As part of the analysis, the AI component 602 can perform an AI analysis or a machine learning analysis on the contact data, the transaction data, and/or the extrinsic information, using one or more AI techniques or algorithms and/or machine learning techniques or algorithms, such as described herein. In accordance with various embodiments, the pool management component 120 can operate in conjunction with the AI component 602 to perform such data analysis and/or can control operation of the AI component 602 to perform or facilitate performing such data analysis.

Based at least in part the results of analyzing the contact data, the transaction data, and/or the extrinsic information, the pool management component 120 and/or AI component 602 can determine or infer one or more users (e.g., user 108, user 110, or user 112) to include in the subset of users to invite to participate in and contribute funds to the pool 124. As part of the analysis, the pool management component 120 and/or AI component 602 can determine the context of the event and/or the recipient user 104, and/or can determine respective affinities of the recipient user 104 to respective users under consideration for inclusion in the subset of users.

As an example, if the recipient user 104 is a teenage boy and the event is a high school graduation, the users selected to participate in the pool 124, the merchants selected to participate in the pool 124, and/or the gift options to be recommended for consideration can be different from the users selected to participate in the pool 124, the merchants selected to participate in the pool 124, and/or the gift options to be recommended for consideration with regard to a different situation (e.g., different context), such as when the recipient user 104 is a man (or woman) in his (or her) who is getting ready to celebrate a $40^{th}$ birthday event. As part of the analysis, the pool management component 120 and/or AI component 602 can take into account the different contexts, situations, or events, the different attributes of the recipient user, the different attributes of users under consideration, and/or the different attributes of the merchants under consideration.

For instance, with further regard to the example situation where the recipient user 104 is a teenage boy and the event is the recipient user's high school graduation, in this example, the user (e.g., user 108) who initiated creation of the pool 124 can be the father of the recipient user 104. The father can desire that the recipient user 104 get something really nice and relatively expensive as a high school graduation gift. Based at least in part the results of analyzing the contact data, the transaction data, and/or the extrinsic information, the pool management component 120 and/or AI component 602 can determine or infer one or more users (e.g., user 108, user 110, or user 112) to include in the subset of users to invite to participate in and contribute funds to the pool 124 such that the subset of users can be particularly suitable to participate in and contribute to the pool 124, as compared to other users who were under consideration, but who were not considered as suitable by the pool management component 120 and/or AI component 602. For instance, the analysis results can indicate that the recipient user 104 has a relatively high/strong affinity for some close teenage school friends, and also can indicate though that those teenage school friends likely will not have a lot of money available to contribute to the pool 124. The analysis results also can indicate that certain relatives (e.g., grandfather, aunt, and uncle) of the recipient user 104 can or may have a relatively high income or wealth, and/or a relatively good (e.g., well paying) job, although the relative affinity to these relatives may not be quite as high as the affinity of the recipient user 104 to his high school friends (e.g., due in part to the recipient user 104 not being in contact with those relatives as much as he is with his close school friends). Based in part on the analysis results and the context of the event and recipient user 104, the pool management component 120 and/or AI component 602 can determine or infer that, even though the relatively affinity of the recipient user 104 towards those close school friends is relatively high, as compared to the relatives, the affinity factor is to weighted lower than the income/wealth factor because the pool 124 was initiated by the father (e.g., user 108) and the event is the high school graduation (e.g., a special one-time event) of the recipient user 104, and thus, it can be determined or inferred that a relatively more expensive gift is desired to be presented to the recipient user 104 for the event. In some embodiments, when initiating creation of the pool 124, the father also can provide preference information that can indicate a preference or goal (e.g., money goal) for trying to get enough contributions to the pool 124 to purchase a relatively expensive gift. The pool management component 120 and/or AI component 602 also can take such preference information into account when determining the users to include in the subset of users.

Accordingly, based at least in part on the analysis results, the context of the recipient user 104 and event, the respective weighting of the factors, and/or the preference information (if any), the pool management component 120 and/or AI component 602 can determine or infer that one or more of the relatives, who are relatively more well-off financially, can be selected to be included in the subset of users over one or more of the close school friends of the recipient user 104 who are relatively less well-off financially, even though one or more of those close school friends have a higher affinity score in relation to the recipient user 104 than the one or more relatives who have been selected to be in the subset of users to be invited to participate in the pool 124.

In a different example, such as, for instance, where the event is a celebration of the recipient user 104, a young woman, turning 23 years old, the pool management component 120 and/or AI component 602 can determine or infer a context of that particular recipient user 104 and that particular event based at least in part on the results of analyzing the contact data, the transaction data, and/or the extrinsic information associated with that recipient user 104 and associated users who are under consideration (wherein such context can be a different context than the example regarding the teenage boy graduating from high school). Based at least in part on such analysis (and/or analysis of preference information (if any) received from the user who initiated the creation of the pool 124), the pool management component 120 and/or AI component 602 can determine or infer that the affinity factor is to be weighted more highly than the income/wealth factor. Accordingly, based at least in part on the analysis results, the context of that particular recipient user 104 and that particular event, the respective weighting of various factors, and/or preference information (if any), the pool management component 120 and/or AI component 602 can determine or infer that certain users (e.g., close girlfriends) with whom the recipient user 104 has relatively higher affinities are to be selected for inclusion in the subset of users to be invited to participate in and contribute to the pool 124 over other users under consideration with regard to whom the recipient user 104 has relatively lower levels of affinity, even if, such other users are relatively more well-off financially than the certain users associated with the higher affinity levels.

With regard to selection of merchants for a pool in connection with an event (e.g., a birthday or a holiday), the pool management component 120 and/or AI component 602 can perform analysis on the contact data, the transaction data, the extrinsic information, and/or preference information to determine or infer one or more merchants (e.g., merchant 114, merchant 116, or merchant 118) to include in the subset of merchants, in accordance with the defined pool management criteria. As one non-limiting example, as part of the analysis, the pool management component 120 and/or AI component 602 can determine that a recipient user 104 recently has been interacting on multiple occasions with certain advertisements for a particular type of good (e.g., flat screen televisions with a relatively large screen size), and, from previous (and less recent) transactions and previous (and less recent) interactions on social media, also can determine that the recipient user 104 has an interest in sports equipment and has made multiple purchases of various types of sports equipment. Based at least in part on the analysis results, and the context of the recipient user 104 and the event, which can indicate that the recipient user 104 has a relatively stronger interest, at least recently, in the particular type of good (e.g., large-sized flat screen televisions) as compared to sports equipment, even though the recipient user 104 has a history of being interested in and purchasing sports equipment, the pool management component 120 and/or AI component 602 can determine or infer that the particular type of good and merchants that sell such type of good are to be weighted more highly than sports equipment and merchants that sell (e.g., primarily sell) sports equipment. Accordingly, based at least in part on the analysis results, the context of that particular recipient user 104 and the event, the respective weighting of the various factors, and/or preference information (if any), the pool management component 120 and/or AI component 602 can determine or infer that one or more merchants (e.g., merchant 114) that sells the particular type of good (e.g., large-sized flat screen televisions) are to be included in the subset of merchants selected to participate in the pool 124 in connection with the event over another merchant who sells sports equipment, even if the recipient user 104 has a relatively higher affinity towards the merchant who sells sports equipment (e.g., based on previous purchases of sports equipment from that merchant).

With regard to determining one or more gift options (e.g., gift for a good or service) in connection with an event (e.g., a birthday or a holiday), the pool management component 120 and/or AI component 602 can perform analysis on the contact data, the transaction data, the extrinsic information, and/or preference information to determine or infer one or more gift options that can be recommended for consideration to be a gift for the recipient user 104 (e.g., out of or over other gift options in the pool 124) and/or for inclusion in the pool 124 as a gift option (e.g., if not included in the pool 124 already). To continue with the flat screen television and sports equipment example, based at least in part on the analysis results, the consideration of the various factors of the set of factors, and the context of the recipient user 104 and the event, which can indicate that the recipient user 104 has a relatively stronger interest, at least recently, in the particular type of good (e.g., large-sized flat screen televisions) as compared to sports equipment, even though the recipient user 104 has a history of being interested in and purchasing sports equipment, the pool management component 120 and/or AI component 602 can determine or infer that one or more types of large-sized flat screen televisions, which can be sold by one or more merchants (e.g., merchant 114), are to be recommended as a gift option(s) for the recipient user 104 and included in and/or highlighted over other products in the pool 124 over an offer for sports equipment, even if the recipient user 104 has a relatively higher affinity towards sports equipment or the merchant who sells the sports equipment (e.g., based on previous purchases of sports equipment).

In view of the example systems and/or devices described herein, example methods that can be implemented in accordance with the disclosed subject matter can be further appreciated with reference to flowcharts in FIGS. 8-11. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

Figure 8:
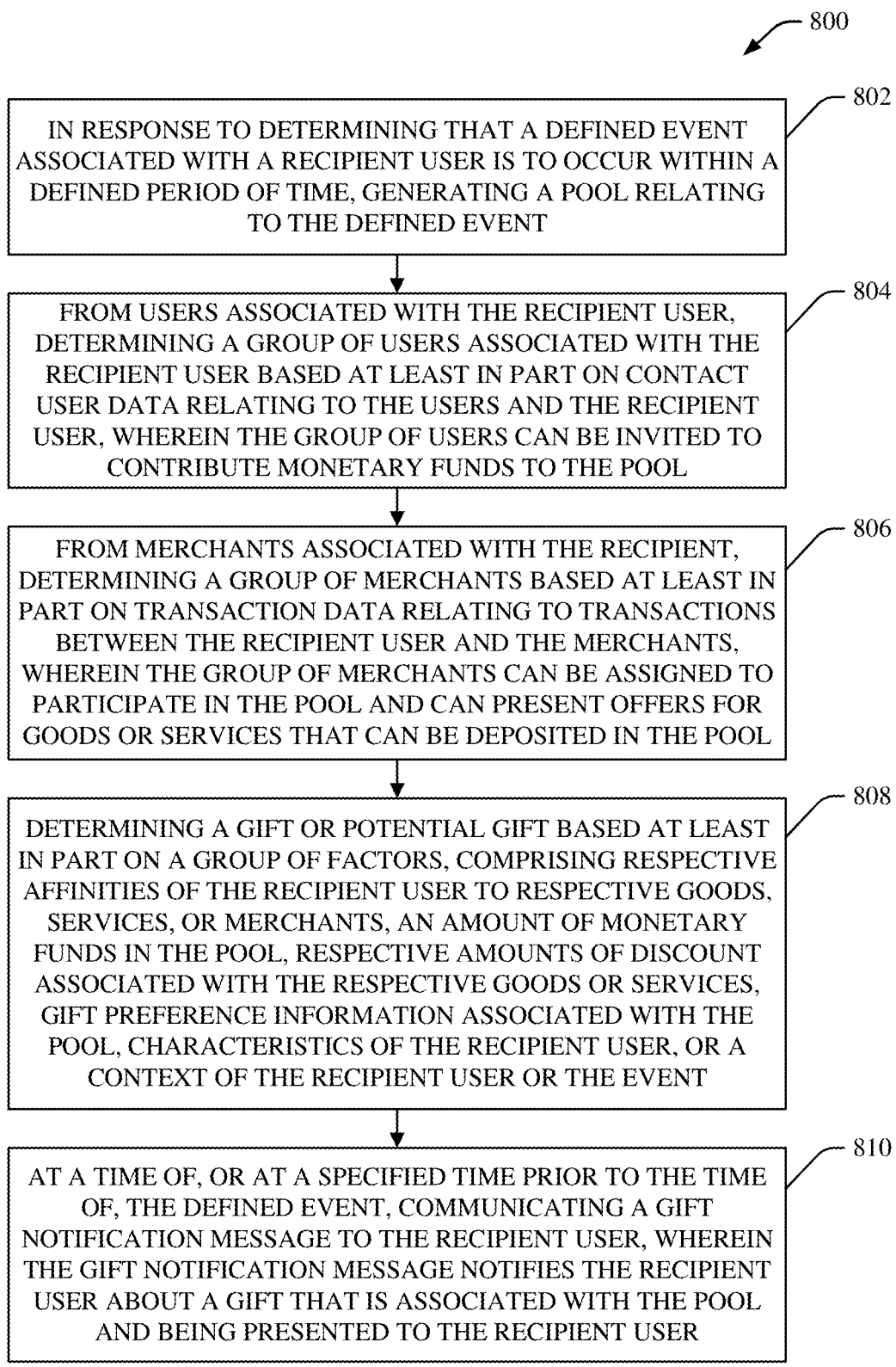
FIG. 8 depicts a flow diagram of an example, non-limiting method that can desirably generate and manage a pool associated with an event and recipient user, in accordance with various aspects and embodiments described herein.

FIG. 8 depicts a flow diagram of an example, non-limiting method 800 that can desirably (e.g., efficiently or optimally) generate and manage a pool associated with an event and recipient user, in accordance with various aspects and embodiments described herein. The method 800 can be employed by, for example, a system comprising the pool management component, a processor component (e.g., of or associated with the pool management component), and/or a data store (e.g., of or associated with the pool management component).

At 802, in response to determining that a defined event associated with a recipient user is to occur within a defined period of time, a pool relating to the defined event can be generated. A user (e.g., a friend, relative, or co-worker associated with the intended recipient user, or the recipient user himself or herself) can initiate the creation of a pool for a desired event by providing information regarding the recipient user and event to the pool management component. The information can comprise identifying information that can identify the recipient user, event information identifying the type of event (e.g., birthday, anniversary, graduation, or custom or generic event, . . . ), the date of the event, and/or other event-related information. The user also can provide other information, such as preference information (e.g., preference for users to be selected to participate in the pool, preference for the number of user to be selected to participate in the pool, preference for type of gift, and/or preference for merchants to be selected to participate in the pool) or user contact information (e.g., contact information for potential users or merchants who may participate in the pool), to the pool management component to facilitate desirable creation of the pool. In response to determining that the defined event associated with the recipient user is to occur within the defined period of time, the pool management component can generate the pool relating to the defined event and the recipient user. The pool management component can control operation of the pool component to facilitate the generation and maintenance of the pool.

At 804, from users associated with the recipient user, a group of users associated with the recipient user can be determined based at least in part on contact user data relating to the users and the recipient user, wherein the group of users can be invited to contribute monetary funds to the pool. The pool management component can analyze contact user data relating to the users and/or other data (e.g., extrinsic information, such as social media information, or preference information relating to selecting users to participate in the pool). Based at least in part on the results of such analysis, the pool management component can determine respective affinities of the recipient user to respective users associated with the recipient user. Also, based at least in part on such analysis results, and the respective affinities of the recipient user to the respective users, the pool management component can determine the group of users to invite to participate in and contribute monetary funds to the pool. The pool management component (e.g., employing the notification component) can communicate notification messages to communication devices associated with users of the group of users to invite the group of users to participate in and contribute monetary funds to the pool.

At 806, from merchants associated with the recipient, a group of merchants can be determined based at least in part on transaction data relating to transactions between the recipient user and the merchants, wherein the group of merchants can be assigned to participate in the pool and can present offers for goods or services that can be deposited in the pool. The pool management component can analyze the transaction data and/or other data (e.g., extrinsic information, such as social media information, or preference information relating to selecting merchants to participate in the pool). Based at least in part on the results of such analysis, the pool management component can determine respective affinities of the recipient user to respective goods, respective services, and/or respective merchants. Also, based at least in part on such analysis results, and the respective affinities of the recipient user to the respective goods, respective services, and/or respective merchants, the pool management component can determine the group of merchants to assign to the pool. The pool management component (e.g., employing the notification component) can communicate notification messages to communication devices associated with the merchants of the group of merchants to inquire as to whether those merchants desire to present offers or discounts for goods or services to the pool.

At 808, a gift or potential gift can be determined based at least in part on one or more factors of a group of factors, comprising respective affinities of the recipient user to respective goods, services, or merchants, an amount of monetary funds in the pool, respective amounts of discount associated with the respective goods or services, gift preference information associated with the pool, characteristics of the recipient user, or a context of the recipient user or the event. The pool management component or the AI component can analyze information relating to the recipient user, goods, services, merchants, the amount of money in the pool, the respective offers or discounts presented by respective merchants, the respective costs (e.g., purchase prices) of respective goods or services, preference information associated with the pool, characteristics of the recipient user, etc. Based at least in part on the results of such analysis, the pool management component or the AI component can determine the context of the recipient user or event, and, from the analysis results and the context, can determine or infer a gift or potential gift (e.g., a gift for a good or service associated with a merchant) that is to be recommended or purchased using the monetary funds in the pool.

In some embodiments, the pool management component can send a recommendation message, which can recommend the gift or potential gift be selected for the recipient user, to communication devices of the users in the group of users. Additionally or alternatively, the pool management component can indicate the recommendation for the gift or potential gift in the pool, wherein, when the recipient user views the pool (after unmasking of the pool) or when users of the group of users view the pool, they can see the recommendation for the gift or potential gift (and/or a ranking of various other potential gifts to be considered for the recipient user). In certain embodiments, if the pool management component is authorized to determine and/or purchase the gift for the recipient user, the pool management component can initiate and perform the purchase of the gift (e.g., the good or service that is the gift), as determined by the pool management component.

While the pool is open, the pool, via the pool management component, can receive respective contributions (e.g., money) from respective users of the group of users, and can receive respective offers (e.g., discounted or non-discounted offers, and/or offers that include additional benefits) for goods or services from respective merchants of the group of merchants. The pool management component, employing the notification component, can provide updates (e.g., update messages) to the user who initiated the pool and/or other users of the user group to update the user(s) regarding the status of the pool, including how much money is in the pool, what offers have been provided to the pool by merchants, and/or how much more money is needed to reach a desired monetary goal.

The pool management component also can keep users and merchants updated regarding how much time is remaining to make contributions to the pool or present offers to the pool before the pool closes via update messages and/or via a countdown timer that can be displayed in proximity to or in connection with the pool. For example, the pool management component can display or facilitate displaying a countdown timer in proximity to or in connection with the pool, wherein the countdown timer can display how much time is remaining until the pool is closed or ended, and will cease to accept contributions or offers, to keep users and merchants informed regarding how much time remains to make contributions to the pool or present offers to the pool.

At 810, at a time of, or at a specified time prior to the time of, the defined event, a gift notification message can be communicated to the recipient user, wherein the gift notification message notifies the recipient user about a gift that is associated with the pool and being presented to the recipient user. At the time of, or at the specified time prior to the time of, the defined event, the pool management component can communicate the gift notification message to a communication device or an electronic messaging account associated with the recipient user, wherein the gift notification message can notify the recipient user about the pool and the gift being presented to the recipient user. The gift can be determined based at least in part on the monetary funds contributed to the pool. The gift can comprise, for example, a monetary gift (e.g., all or part of the monetary funds in the pool), or a good or a service associated with a merchant of the group of merchants.

The recipient user, using the communication device, can communicate an acceptance message to the pool management component to accept the gift. In response to the acceptance message, the pool management component can communicate gift information to the communication device of the recipient user to transfer or facilitate the transfer of the gift to the recipient user.

Figure 9:
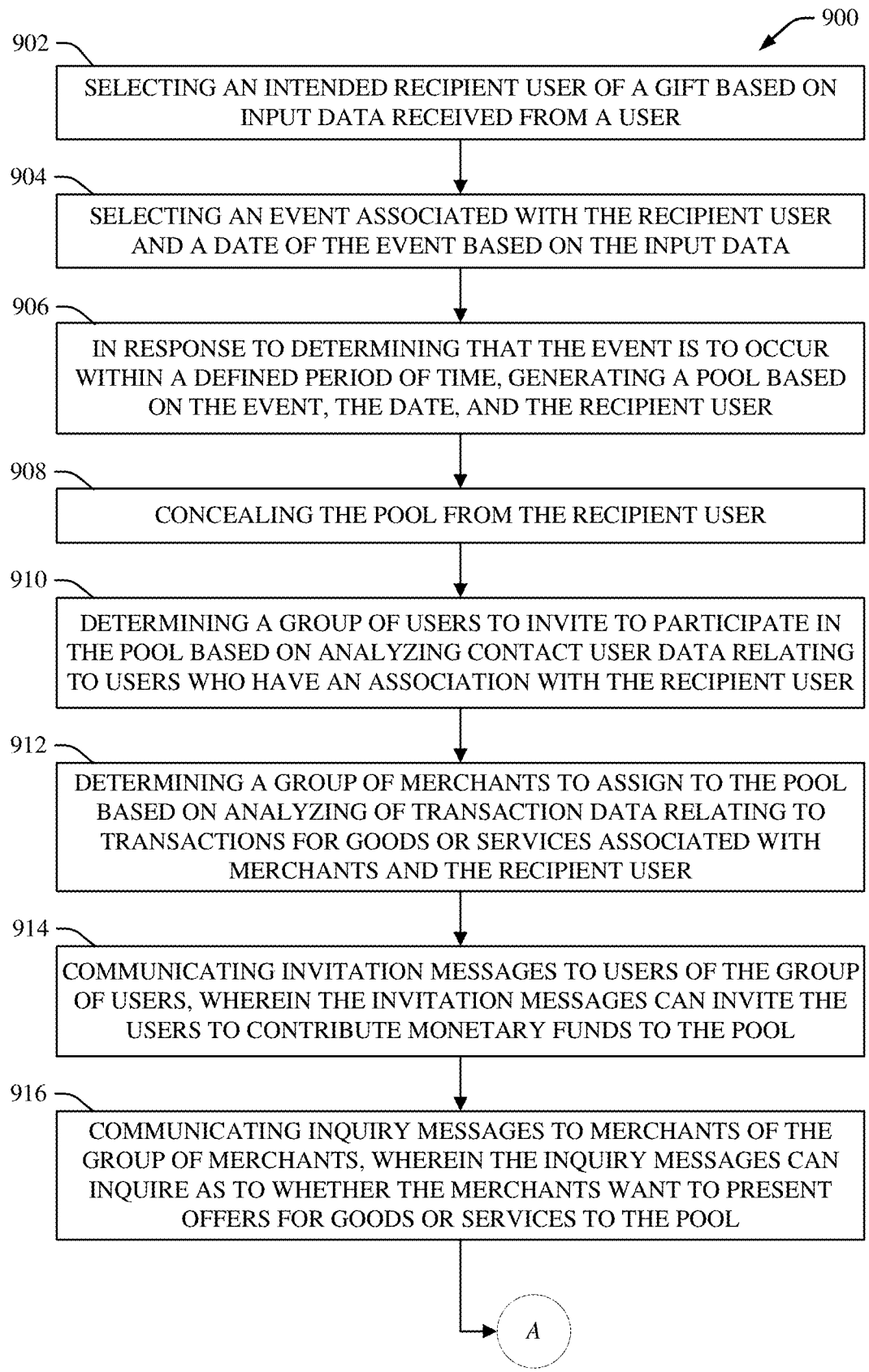
FIGS. 9 and 10 illustrate a flow diagram of another example, non-limiting method that can desirably generate and manage a pool associated with an event and recipient user, in accordance with various aspects and embodiments described herein.
Figure 10:
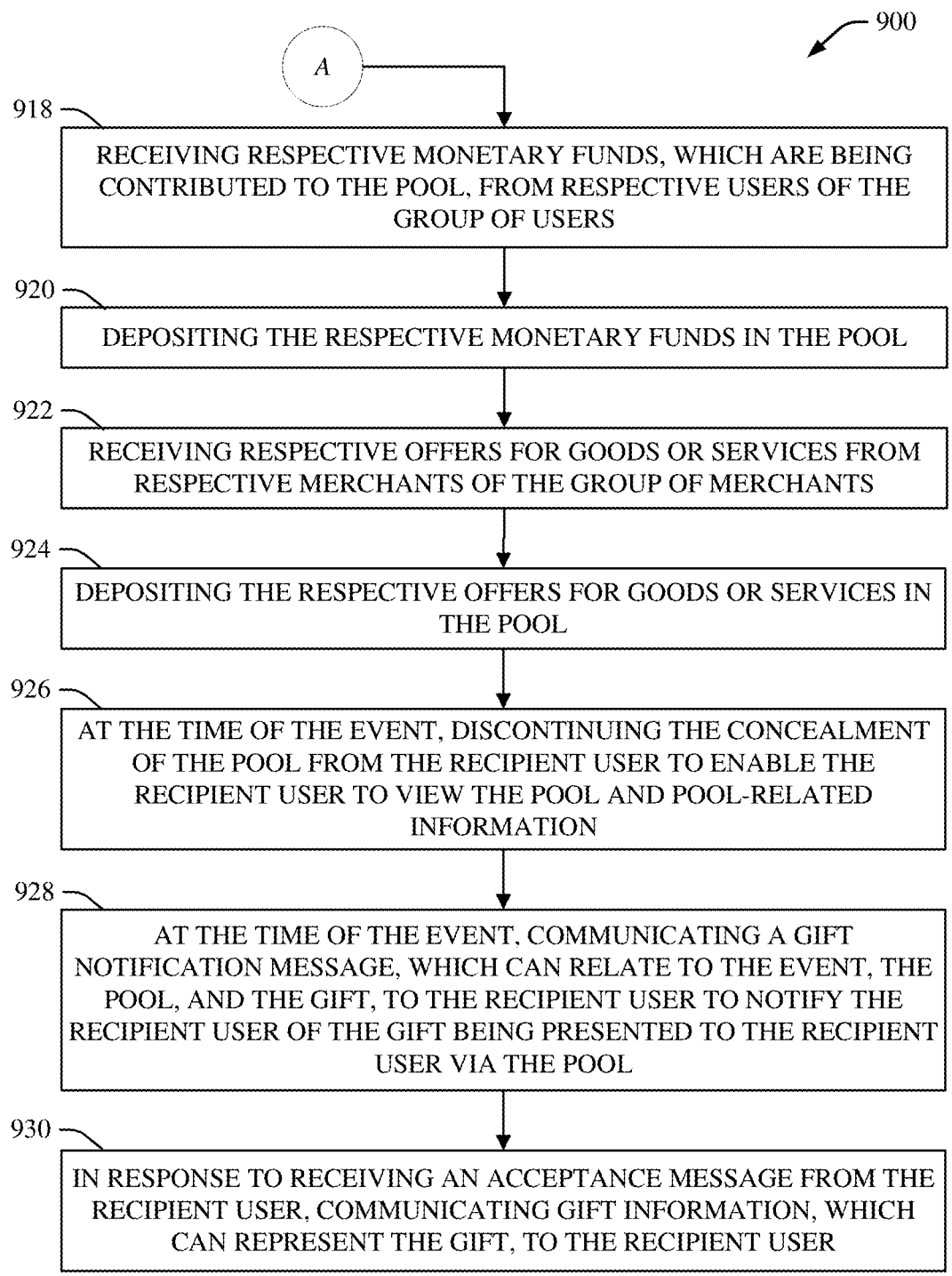

FIGS. 9 and 10 illustrate a flow diagram of another example, non-limiting method 900 that can desirably (e.g., efficiently or optimally) generate and manage a pool associated with an event and recipient user, in accordance with various aspects and embodiments described herein. The method 900 can be employed by, for example, a system comprising the pool management component, a processor component (e.g., of or associated with the pool management component), and/or a data store (e.g., of or associated with the pool management component).

At 902, an intended recipient user of a gift can be selected based at least in part on input data received from a user. At 904, an event associated with the recipient user and a date of the event can be selected based at least in part on the input data. The pool management component can receive the input data from a user via a communication device of the user. The user can be, for example, a friend, relative, or co-worker of the recipient user, or can even be the recipient user himself or herself. The input data can indicate who the recipient user is, can provide contact information (e.g., phone number, email address, residential address) regarding the recipient user, can provide other information (e.g., characteristics, such as age, gender, or interests, . . . ) regarding the recipient user, and/or can provide preference information relating to the pool, such as more fully described herein. Based at least in part on the results of analyzing such input data, the pool management component can determine and select the recipient user, determine and select the event (e.g., the type of event or occasion), and determine and select the date of the event.

At 906, in response to determining that the event is to occur within a defined period of time, a pool can be generated based at least in part on the event, the date, and the recipient user. Over time, the pool management component can track the various events, including the event, for which pools are to be created. In response to determining that the event is to occur within the defined period of time, the pool management component can generate the pool based at least in part on the event, the date, and the recipient user. The defined period of time prior to the event for generation of the pool can be determined by the pool management component based at least in part on the input data (e.g., information indicating or specifying a pool creation date or deadline) received from the user or other information, or can be a default period of time, for example, if no period of time is otherwise provided or selected by the user. Depending on the type of event and the input data, the pool management component can generate the pool, for example, five days prior to the event, one week prior to the event, two weeks prior to the event, or another desired amount of time prior to the event that is greater or lesser than two weeks prior to the event (e.g., in accordance with the pool creation date or deadline provided by the user, or otherwise selected by default).

At 908, the pool can be concealed from the recipient user. The pool management component, employing the masking component, can mask the pool to conceal or hide the pool from the recipient user and a communication device(s) associated with the recipient user to prevent the recipient user from detecting or viewing the pool and pool-related information prior to a desired time (e.g., prior to the time of the event).

At 910, a group of users to invite to participate in the pool can be determined based at least in part on analyzing of contact user data relating to users who have an association with the recipient user. The pool management component can access the contact user data from the contact management component. The pool management component can analyze the contact user data, which can relate to or indicate users who have some kind of an association with the recipient user. For example, the users can be relatives, friends, co-workers, acquaintances, or business contacts of the recipient user, or can have some other type of association with the recipient user. As part of the analysis of the contact user data or other data (e.g., social media information, or preference information), the pool management component can determine respective affinities of the recipient user with respect to respective users. Based at least in part on the analysis results and the respective affinities of the recipient user to respective users, from the users associated with the recipient user, the pool management component can determine the group of users to invite to participate in the pool. For example, based at least in part on such analysis, the pool management component can rank the respective users according to respective affinities and/or another desired factor(s), and the pool management component can select a desired number (e.g., five, or more or less than five) of the highest ranking users to be in the group of users to invite to participate in the pool.

At 912, a group of merchants to assign to the pool can be determined based at least in part on analyzing of transaction data relating to transactions for goods or services associated with merchants and the recipient user. The pool management component can access the transaction data from the contact management component. The pool management component can analyze the transaction data, which can relate to previous transactions or potential transactions (e.g., potential interest of the recipient user to engage in a transaction) for goods or services associated with merchants and the recipient user (e.g., between the merchants and the recipient user). As part of the analysis of the transaction data or other data (e.g., social media information, or preference information), the pool management component also can determine respective affinities of the recipient user with respect to respective merchants, respective goods, and/or respective services. Based at least in part on the analysis results and the respective affinities of the recipient user to respective merchants, from the merchants associated with the recipient user, the pool management component can determine the group of merchants to assign to the pool. For instance, based at least in part on such analysis, the pool management component can rank the respective merchants, respective goods (and associated merchants), or respective services (and associated merchants) according to respective affinities and/or another desired factor(s), and the pool management component can select a desired number (e.g., five, or more or less than five) of the highest ranking merchants to be in the group of merchants to assign to the pool.

At 914, invitation messages can be communicated to users of the group of users, wherein the invitation messages can invite the users to contribute monetary funds to the pool. The pool management component, employing the notification component, can communicate respective invitation messages to respective communication devices associated with respective users of the group of users. The respective invitation messages can invite the respective users to contribute monetary funds to the pool.

At 916, inquiry messages can be communicated to merchants of the group of merchants, wherein the inquiry messages can inquire as to whether the merchants want to present offers for goods or services to the pool. The pool management component, employing the notification component, can communicate respective inquiry messages to respective communication devices associated with respective merchants of the group of merchants. The respective inquiry messages can inquire as to whether the respective merchants want to present respective offers for respective goods or services to the pool. An offer can merely be an offer for a good or service in general, or an offer can be a discount on the cost of a good or service of the merchant. At this point, the method 900 can proceed to reference point A, wherein, as depicted in FIG. 10, the method 900 can proceed from reference point A to the act associated with reference numeral 918.

At 918, respective monetary funds, which are being contributed to the pool, can be received from respective users of the group of users. At 920, the respective monetary funds can be deposited in the pool. Respective users of the group of users, for example, using their communication devices, can contribute to the pool by sending or transferring respective monetary funds (e.g., electronic monetary funds, which can be monetary fund information that can represent the amount of monetary funds being contributed) to the pool. The pool management component can receive the respective monetary funds (e.g., electronic monetary funds) from the respective communication devices or respective financial accounts associated with the respective users of the group of users. The pool management component can deposit the respective monetary funds into the pool.

At 922, respective offers for goods or services can be received from respective merchants of the group of merchants. At 924, the respective offers for goods or services can be deposited in the pool. Respective merchants of the group of merchants, for example, using their communication devices, can present respective offers for respective goods or services to the pool by sending or transferring respective offer information, which can represent the respective offers, to the pool. The pool management component can receive the respective offer information, representing the respective offers, from the respective communication devices associated with the respective merchants of the group of merchants. The pool management component can deposit the respective offers into the pool.

At 926, at the time of the event, the concealment of the pool from the recipient user can be discontinued to enable the recipient user to view the pool and the pool-related information. At the time of the event, the pool management component, employing the masking component, can discontinue the concealment of the pool from the recipient user to enable the recipient user and/or associated communication device to access and view the pool and pool-related information.

At 928, at the time of the event, a gift notification message, which can relate to the event, the pool, and the gift, can be communicated to the recipient user to notify the recipient user of the gift being presented to the recipient user via the pool. At the time of the event, the pool management component, employing the notification component, can communicate the gift notification message to the communication device or electronic messaging account (e.g., email account, social media account, or text message account, . . . ) of the recipient user to notify the recipient user of the gift being presented to the recipient user via the pool. The gift can comprise a monetary gift (e.g., all or a (remaining) portion of the monetary funds in the pool) based on the monetary funds contributed to the pool, a good or service associated with a merchant and purchased using the monetary funds, and/or an offer(s) (e.g., general offer or discount offer) for a good or service of a merchant(s).

At 930, in response to receiving an acceptance message from the recipient user, gift information, which can represent the gift, can be communicated to the recipient user. In response to receiving an acceptance message from the communication device or the electronic messaging account associated with the recipient user, the pool management component can communicate or transfer gift information, which can represent the gift, to the communication device, the electronic messaging account, or an electronic financial account associated with the recipient user.

Figure 11:
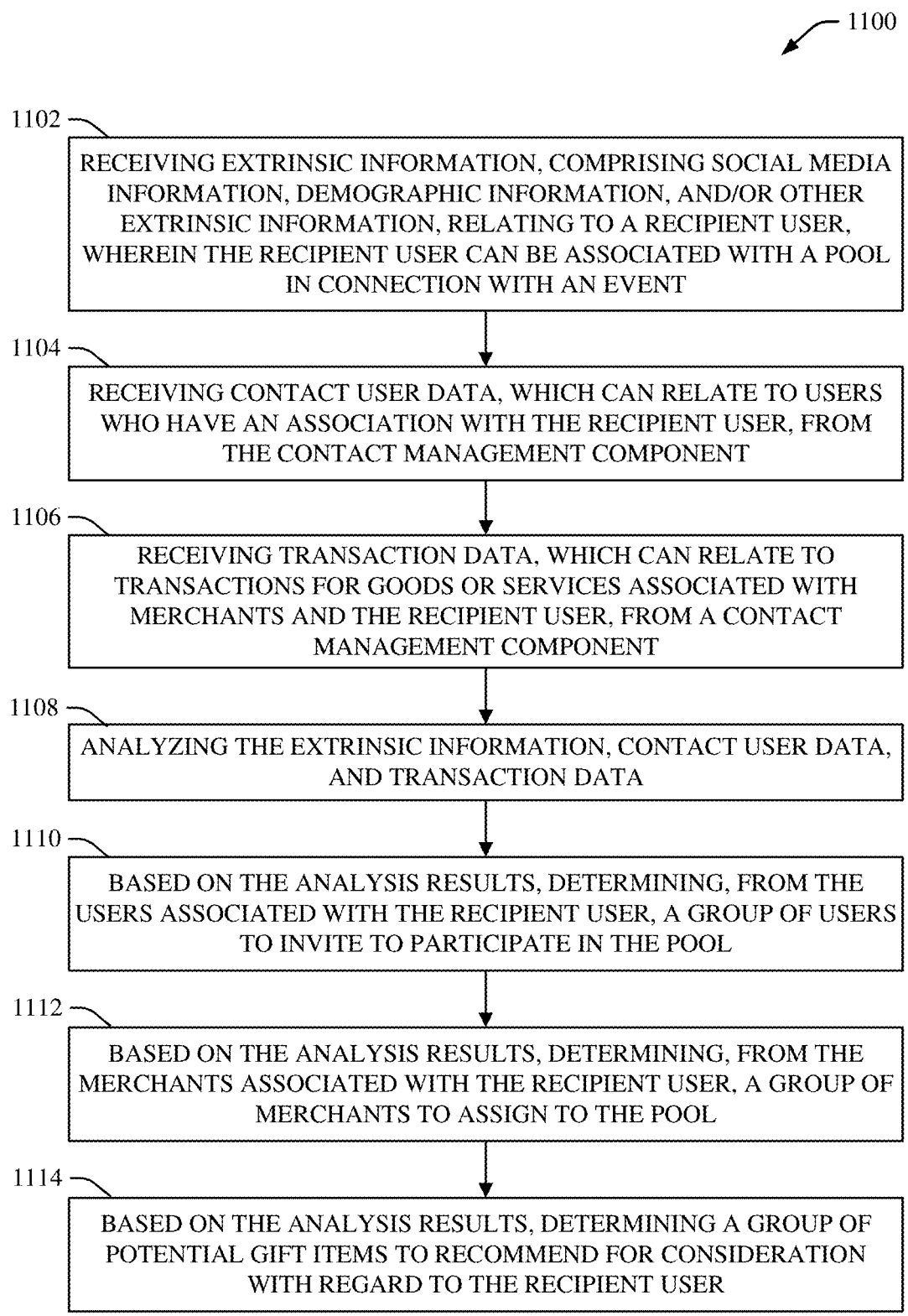
FIG. 11 illustrates a flow diagram of an example, non-limiting method that can utilize extrinsic information and other information to facilitate determining a group of users, a group of merchants, and a group of gift items to recommend, with respect to a pool associated with an event and a recipient user, in accordance with various aspects and embodiments of the disclosed subject matter.

FIG. 11 illustrates a flow diagram of an example, non-limiting method 1100 that can utilize extrinsic information and other information to facilitate determining a group of users, a group of merchants, and a group of gift items to recommend, with respect to a pool associated with an event and a recipient user, in accordance with various aspects and embodiments of the disclosed subject matter. The method 1100 can be employed by, for example, a system comprising the pool management component, a processor component (e.g., of or associated with the pool management component), and/or a data store (e.g., of or associated with the pool management component).

At 1102, extrinsic information, comprising social media information, demographic information, and/or other extrinsic information, relating to a recipient user can be received, wherein the recipient user can be associated with a pool in connection with an event. The pool management component can receive social media information relating to the recipient user from one or more data sources (e.g., social media accounts or applications used by the recipient user; or third-party data sources that aggregate social media information of users). The social media information can comprise information regarding users with whom the recipient user has had contact or relationships, information regarding goods, services, or merchants with regard to which the recipient user has interacted or expressed an interest, information regarding interests or potential interests of the recipient user, and/or other information that can be relevant to determining users to include in a group of users for the pool, merchants to include in the group of merchants for the pool, and/or potential gift items that can be recommended for inclusion in the pool. The pool management component also can receive demographic information associated with (e.g., that can be relevant to) the recipient user from one or more data sources that aggregate and provide demographic information regarding users. The pool management component also can receive other types of extrinsic information relating to the recipient user from one or more other data sources.

At 1104, contact user data relating to users who have an association with the recipient user can be received from the contact management component. The pool management component can access the contact management component and can receive the contact user data from the contact management component. The contact user data can comprise or relate to phone contact data, email contact data, other contact data, and/or other personal information of users who are or may be associated with the recipient user.

At 1106, transaction data relating to transactions for goods or services associated with merchants and the recipient user can be received from a contact management component. The pool management component can access the contact management component and can receive the transaction data from the contact management component. The transaction data can relate to previous transactions or potential transactions (e.g., potential interest expressed in a transaction) for goods or services associated with (e.g., between) merchants and the recipient user. The transaction data also can include information relating to the merchants, such as, for example, the name of a merchant, business address of a merchant, online website address of a merchant, phone number of a merchant, email address of a merchant, goods and services offered by a merchant, and/or other desired information associated with a merchant.

At 1108, the extrinsic information, contact user data, and transaction data can be analyzed. The pool management component or AI component can analyze the extrinsic information, contact user data, transaction data, and/or other information (e.g., information regarding money contributed to the pool, or offers for goods or services deposited into the pool, after the pool is created, . . . ), such as more fully described herein. In some embodiments, the AI component can perform an AI analysis or ML analysis on the extrinsic information, contact user data, transaction data, and/or other information, such as more fully described herein.

At 1110, based at least in part on the analysis results, from the users associated with the recipient user, a group of users to invite to participate in the pool can be determined. Based at least in part on the analysis results, from the users associated with the recipient user, the pool management component or AI component can determine users (e.g., a portion of the users) to be in the group of users to invite to participate in the pool, such as more fully described herein.

At 1112, based at least in part on the analysis results, from the merchants associated with the recipient user, a group of merchants to assign to the pool can be determined. Based at least in part on the analysis results, from the merchants associated with the recipient user, the pool management component or AI component can determine merchants (e.g., a portion of the merchants) to be in the group of merchants to assign to the pool, such as more fully described herein.

At 1114, based at least in part on the analysis results, a group of potential gift items to recommend for consideration with regard to the recipient user can be determined. Based at least in part on the analysis results (e.g., results of analyzing the extrinsic information, contact user data, transaction data, and/or other information), the pool management component or AI component can determine a group of potential gift items to recommend for consideration (e.g., by one or more of the users, or by the recipient user) with regard to the recipient user, such as more fully described herein. The pool management component or AI component can consider (e.g., evaluate) one or more of a variety of factors in determining which gift items to include in the group of gift items, wherein such factors can comprise, for example, characteristics of the recipient user, the event, context of the recipient user or the event, respective affinities of the recipient user to respective goods, services, or merchants, the amount of monetary funds contributed to the pool, respective costs of respective goods or services, the respective discount amounts being offered on respective goods or services by respective merchants, preference information (e.g., preference for a particular good, service, or merchant; or cost preference) associated with the recipient user or an associated user (e.g., the user who initiated creation of the pool), and/or other desired factors.

Figure 12:
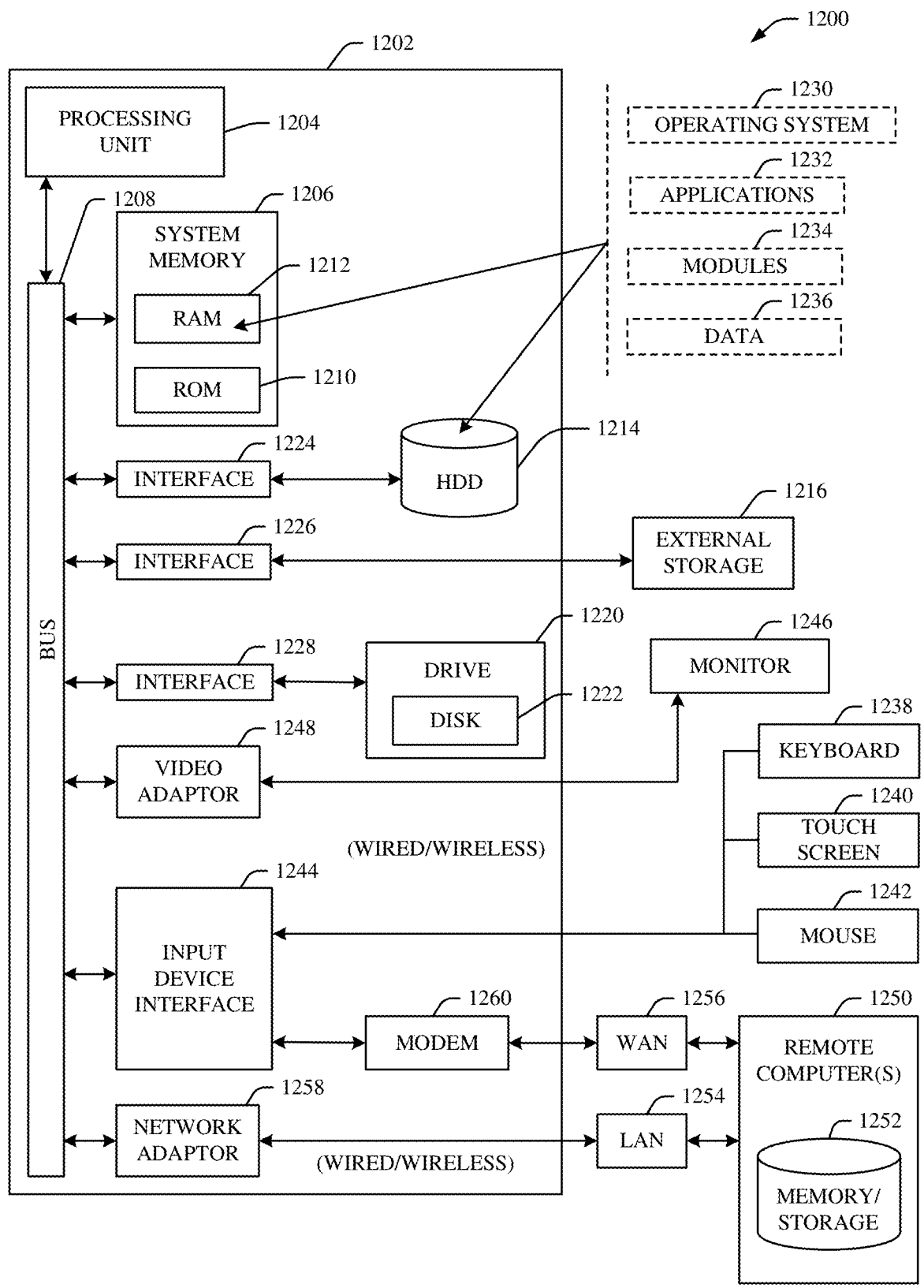
FIG. 12 illustrates a block diagram of an example, non-limiting operating environment in which one or more embodiments described herein can be facilitated.

In order to provide additional context for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and a drive 1220, e.g., such as a solid state drive, an optical disk drive, which can read or write from a disk 1222, such as a CD-ROM disc, a DVD, a BD, etc. Alternatively, where a solid state drive is involved, disk 1222 would not be included, unless separate. While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214, external storage device(s) 1216 and drive 1220 can be connected to the system bus 1208 by an HDD interface 1224, an external storage interface 1226 and a drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enable with a security module, such as a trusted processing module (TPM). For instance with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above, such as but not limited to a network virtual machine providing one or more aspects of storage or processing of information. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 13:
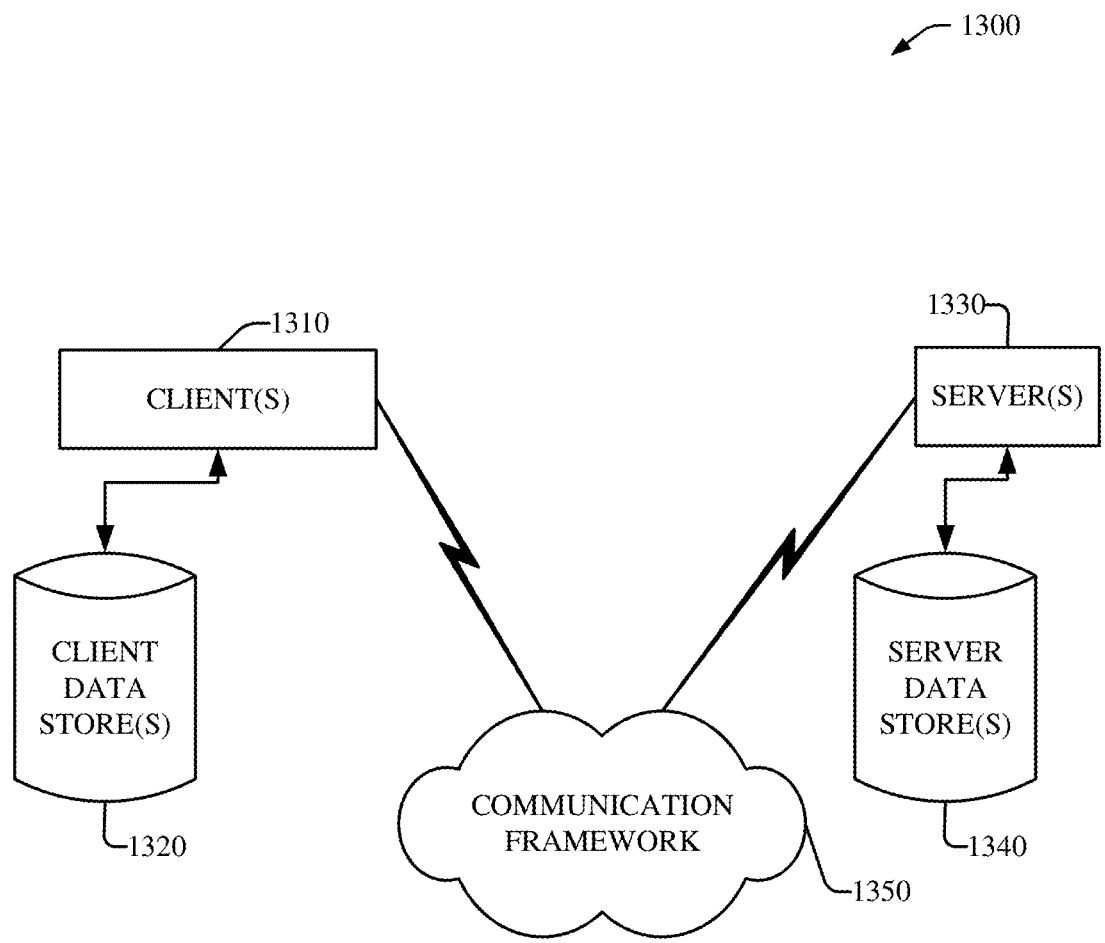
FIG. 13 illustrates an example networking environment operable to execute various implementations described herein.

FIG. 13 is a schematic block diagram of a sample computing environment 1300 with which the disclosed subject matter can interact. The sample computing environment 1300 includes one or more client(s) 1310. The client(s) 1310 can be hardware and/or software (e.g., threads, processes, computing devices). The sample computing environment 1300 also includes one or more server(s) 1330. The server(s) 1330 can also be hardware and/or software (e.g., threads, processes, computing devices). The servers 1330 can house threads to perform transformations by employing one or more embodiments as described herein, for example. One possible communication between a client 1310 and a server 1330 can be in the form of a data packet adapted to be transmitted between two or more computer processes. The sample computing environment 1300 includes a communication framework 1350 that can be employed to facilitate communications between the client(s) 1310 and the server(s) 1330. The client(s) 1310 are operably connected to one or more client data store(s) 1320 that can be employed to store information local to the client(s) 1310. Similarly, the server(s) 1330 are operably connected to one or more server data store(s) 1340 that can be employed to store information local to the servers 1330.

The disclosed subject matter can be a system, a method, an apparatus and/or a computer program product at any possible technical detail level of integration. The computer program product can include a computer readable storage medium (or media) having computer readable program instructions thereon for causing a processor to carry out aspects of the disclosed subject matter. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the disclosed subject matter can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the disclosed subject matter.

Aspects of the disclosed subject matter are described herein with reference to flowchart illustrations and/or block diagrams of methods, apparatus (systems), and computer program products according to embodiments of the disclosed subject matter. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the disclosed subject matter. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM)). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

It is to be appreciated and understood that components (e.g., communication device, communication network, pool management component, pool component, event component, contact management component, artificial intelligence component, processor component, data store, . . . ), as described with regard to a particular system or method, can include the same or similar functionality as respective components (e.g., respectively named components or similarly named components) as described with regard to other systems or methods disclosed herein.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a processor that executes computer-executable components stored in a memory, the computer-executable components comprising:
a pool management component that trains a neural network model to analyze data relating to users, merchants, transactions, and social media activity to generate gift pools;
an event generator component that generates, using the neural network model, a gift pool for an event associated with a recipient user;
an artificial intelligence component that analyzes, using the neural network model, context associated with the event, and selects, using the neural network model, the set of candidates, from a set of users and a set of merchants, to join the gift pool associated with the event, wherein the set of candidates comprises a subset of users of the set of the users selected to contribute monetarily for a gift to the recipient user, and a subset of merchants of the set of merchants to offer at least one discount on at least one good or service for the gift, and wherein the set of the users are ranked based upon attributes of the users comprising respective wealth of the users, and the subset of users comprises a threshold number of highest ranked users;
a notification component that notifies the set of candidates of the event and the gift pool;
a tracking component that tracks attendee information regarding a subset of the candidates who are attendees who have agreed to join the gift pool;
a pool component that receives respective contributions from the attendees towards participation in the gift pool, wherein, at a time of the event, the notification component notifies the recipient user regarding a gift associated with the gift pool and being presented to the recipient user, wherein the gift is based on the respective contributions, and wherein the gift comprises a monetary gift, or a good or a service associated with a merchant of the set of merchants; and
a gift determination component that analyzes, using the neural network model, a set of factors relating to the recipient user, wherein, based on a result of analyzing the set of factors, the gift determination component determines, using the neural network model, a gift item or a potential gift item that is to be recommended to be the gift or purchased as the gift using the contributions, comprising monetary funds, contributed to the gift pool by at least a portion of the attendees, and wherein the set of factors comprises the context of the event.

2. The system of claim 1, wherein the computer-executable components further comprise:
a filter component that filters the set of users to generate the subset of users based on respective affinity for the event of the subset of users.

3. The system of claim 1, wherein the computer-executable components further comprise:
a masking component that, prior to the event, masks the recipient user from being able to perceive the gift pool and information relating to the gift pool,
wherein, at the time of the event, the masking component unmasks the gift pool and the information relating to the gift pool to enable the recipient user to perceive the gift pool and the information relating to the gift pool, and
wherein, in response to receiving an acceptance message indicating an acceptance of the gift by the recipient user, gift data relating to the gift is transferred to at least one of a communication device, an electronic messaging account, or an electronic financial account associated with the recipient user.

4. The system of claim 1, wherein the set of factors comprises the context of the event; respective affinities of the recipient user to respective goods, respective services, or respective merchants of the set of merchants; an amount of the monetary funds in the gift pool; respective amounts of discount associated with the respective goods or the respective services; gift preference information associated with the gift pool; or attributes of the recipient user.

5. The system of claim 1, wherein the artificial intelligence component selects, using the neural network model, a final set of merchants to utilize for the gift pool based on respective affinity between the recipient user and respective merchants of the set of merchants, respective goods associated with the respective merchants, or respective services associated with the respective merchants, in relation to the event.

6. The system of claim 5, wherein the computer-executable components further comprise:
a provisioning component that allocates, using the neural network model, the respective contributions of the gift pool toward at least one merchant service of the merchant services or at least one merchant good of the merchant goods provided by the final set of merchants.

7. The system of claim 1, wherein the event is a celebration associated with the recipient user, and the artificial intelligence component infers, using the neural network model, the gift wanted by the recipient user based on intrinsic or extrinsic information associated with the recipient user.

8. The system of claim 7, wherein the computer-executable components further comprise:
a security component that applies access rules to the intrinsic or extrinsic information associated with the recipient user.

9. A method, comprising:
training, by a system comprising a processor, a neural network model to analyze data relating to users, merchants, transactions, and social media activity to generate gift pools;
generating, by the system, using the neural network model, a gift pool for an event associated with a recipient user;
analyzing, by the system, using the neural network model, context associated with the event;
selecting, by the system, using the neural network model, the set of candidates, from a set of users and a set of merchants, to participate in the gift pool associated with the event, wherein the set of candidates comprises a subset of users of the set of the users selected to contribute monetarily for a gift to the recipient user, and a subset of merchants of the set of merchants to offer at least one discount on at least one good or service for the gift, and wherein the set of the users are ranked based upon one or more attributes of the users defined in respective user profiles of the users, and the subset of users comprises a threshold number of highest ranked users;
notifying, by the system, the set of candidates of the event and the gift pool;
tracking, by the system, attendee information regarding a subset of the candidates who are attendees who have agreed to participate in the gift pool;
receiving, by the system, respective contributions from the attendees towards participation in the gift pool;
analyzing, by the system, using the neural network model, a set of factors relating to the recipient user, and based on a result of analyzing the set of factors, determining, by the system, using the neural network model, a gift item or a potential gift item that is to be recommended to be the gift or purchased as the gift using the contributions, comprising monetary funds, contributed to the gift pool by at least a portion of the attendees, and wherein the set of factors comprises the context of the event; and
at a time of the event, notifying, by the system, the recipient user regarding a gift associated with the gift pool and being presented to the recipient user, wherein the gift is based on the respective contributions, and wherein the gift comprises a monetary gift, or a good or a service associated with a merchant of the set of merchants.

10. The method of claim 9, wherein the one or more attributes comprise respective ages of the users.

11. The method of claim 9, further comprising:
prior to the event, masking, by the system, the recipient user from being able to perceive the gift pool and information relating to the gift pool;
at the time of the event, unmasking, by the system, the gift pool and the information relating to the gift pool to enable the recipient user to perceive the gift pool and the information relating to the gift pool; and
in response to receiving an acceptance message indicating an acceptance of the gift by the recipient user, transferring, by the system, gift data relating to the gift to at least one of a communication device, an electronic messaging account, or an electronic financial account associated with the recipient user.

12. The method of claim 9, wherein the set of factors comprises the context of the event; respective affinities of the recipient user to respective goods, respective services, or respective merchants of the set of merchants; an amount of the monetary funds in the gift pool; respective amounts of discount associated with the respective goods or the respective services; gift preference information associated with the gift pool; or attributes of the recipient user.

13. The method of claim 9, further comprising selecting, by the system, using the neural network model, a final set of merchants to utilize for the gift pool based on respective affinity between the recipient user and respective merchants of the set of merchants, respective goods associated with the respective merchants, or respective services associated with the respective merchants, in relation to the event.

14. The method of claim 9, further comprising allocating, by the system, using the neural network model, the respective contributions of the gift pool toward at least one merchant service of the merchant services or at least one merchant good of the merchant goods provided by the final set of merchants.

15. The method of claim 9, wherein the event is a celebration associated with the recipient user, and further comprising inferring, by the system, using the neural network model, the gift wanted by the recipient user based on intrinsic or extrinsic information associated with the recipient user.

16. The method of claim 15, further comprising applying, by the system access rules to the intrinsic or extrinsic information associated with the recipient user.

17. A non-transitory machine-readable medium, comprising executable instructions that, when executed by a processor, facilitate performance of operations, comprising:
train a neural network model to analyze data relating to users, merchants, transactions, and social media activity to generate gift pools;
generate, using the neural network model, a gift pool for an event associated with a recipient user;
select, using the neural network model, the set of candidates, from a set of users and a set of merchants, to participate in the gift pool associated with the event, wherein the set of candidates comprises a subset of users of the set of the users selected to contribute monetarily for a gift to the recipient user, and a subset of merchants of the set of merchants to offer at least one discount on at least one good or service for the gift, and wherein the set of the users are ranked based upon one or more attributes of the users, and the subset of users comprises a threshold number of highest ranked users;

notify the set of candidates of the event and the gift pool;

track attendee information regarding a subset of the candidates who are attendees who have agreed to participate in the gift pool;

receive respective contributions from the attendees towards participation in the gift pool;

analyze, using the neural network model, a set of factors relating to the recipient user, and based on a result of analyzing the set of factors, determine, using the neural network model, a gift item or a potential gift item that is to be recommended to be the gift or purchased as the gift using the contributions, comprising monetary funds, contributed to the gift pool by at least a portion of the attendees, and wherein the set of factors comprises the context of the event; and at a time of the event, notify the recipient user regarding a gift associated with the gift pool and being presented to the recipient user, wherein the gift is based on the respective contributions, and wherein the gift comprises a monetary gift, or a good or a service associated with a merchant of the set of merchants.

18. The non-transitory machine-readable medium of claim 17, wherein the one or more attributes comprise respective incomes of the users.

19. The non-transitory machine-readable medium of claim 17, wherein the operations further comprise:

prior to the event, mask the recipient user from being able to perceive the gift pool and information relating to the gift pool;

at the time of the event, unmask the gift pool and the information relating to the gift pool to enable the recipient user to perceive the gift pool and the information relating to the gift pool; and in response to receiving an acceptance message indicating an acceptance of the gift by the recipient user, transfer gift data relating to the gift to at least one of a communication device, an electronic messaging account, or an electronic financial account associated with the recipient user.

20. The non-transitory machine-readable medium of claim 17, wherein the set of factors comprises the context of the event; respective affinities of the recipient user to respective goods, respective services, or respective merchants of the set of merchants; an amount of the monetary funds in the gift pool; respective amounts of discount associated with the respective goods or the respective services; gift preference information associated with the gift pool; or attributes of the recipient user.

* * * * *